US012317456B2

(12) United States Patent
Sahu et al.

(10) Patent No.: US 12,317,456 B2
(45) Date of Patent: May 27, 2025

(54) HEAT SINK SYSTEM

(71) Applicant: UT-Battelle, LLC, Oak Ridge, TN (US)

(72) Inventors: Raj Sahu, Oak Ridge, TN (US); Emre Gurpinar, Oak Ridge, TN (US); Burak Ozpineci, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 564 days.

(21) Appl. No.: 17/495,098

(22) Filed: Oct. 6, 2021

(65) Prior Publication Data

US 2022/0117109 A1 Apr. 14, 2022

Related U.S. Application Data

(60) Provisional application No. 63/089,658, filed on Oct. 9, 2020.

(51) Int. Cl.
*H05K 7/20* (2006.01)
*G06F 30/28* (2020.01)

(52) U.S. Cl.
CPC ............ *H05K 7/209* (2013.01); *G06F 30/28* (2020.01); *H05K 7/20272* (2013.01); *H05K 7/20927* (2013.01); *H05K 7/20218* (2013.01)

(58) Field of Classification Search
None
See application file for complete search history.

(56) References Cited

U.S. PATENT DOCUMENTS

| | | | |
|---|---|---|---|
| 6,330,157 B1 * | 12/2001 | Bezama | H01L 23/473 361/689 |
| 10,852,069 B2 * | 12/2020 | Poltorak | F28F 13/12 |
| 10,914,535 B2 * | 2/2021 | Vos | B23P 15/26 |
| 11,031,312 B2 * | 6/2021 | Poltorak | H01L 23/367 |
| 11,209,220 B2 * | 12/2021 | Poltorak | F28F 21/02 |
| 11,437,297 B2 * | 9/2022 | Ying | H01L 21/50 |
| 11,886,258 B2 * | 1/2024 | Gao | H05K 7/20154 |
| 2009/0166854 A1 * | 7/2009 | Jewram | H01L 23/3735 438/584 |
| 2014/0183957 A1 * | 7/2014 | Duchesneau | F01K 13/006 307/64 |
| 2019/0021186 A1 * | 1/2019 | Poltorak | F28F 3/048 |
| 2022/0228811 A9 * | 7/2022 | Bozorgi | B23P 15/26 |
| 2022/0232732 A1 * | 7/2022 | Alvarado | H01L 23/3677 |

FOREIGN PATENT DOCUMENTS

WO WO-2007019531 A2 * 2/2007 ............. G06F 17/50

OTHER PUBLICATIONS

Diabatix website, available at www.diabatix.com, downloaded on Oct. 1, 2021, pp. 1-33.
Dede, E.M. et al., "Topology Optimization, Additive Layer Manufacturing, and Experimental Testing of an Air-Cooled Heat Sink," Journal of Mechanical Design, vol. 137, Nov. 2015, pp. 1-9.

* cited by examiner

*Primary Examiner* — Courtney L Smith
(74) *Attorney, Agent, or Firm* — Warner Norcross + Judd LLP

(57) ABSTRACT

A system and method for generating a heat sink for circuitry, such as a power module, that facilitates removal of heat from the circuitry. To improve power density of power modules, not only electrical but also thermal optimization may be carried out as the two subsystems closely interact with each other.

7 Claims, 13 Drawing Sheets

Total Pressure Drop: 1.9 kPa $N_{hs} = 2, L_x = 45.1$ mm $F_0 = 6.85$ mm, $h = [4, 26]$, $F_h = [0.74, 1.8]$ mm, $\phi_h = [1.96, 1.72]\pi$ Steady-state Thermal Performance Steady-state Fluid-flow Uniform Cooling Cold Plate HTC 5000 W/m²K

HEAT SINK SYSTEM

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF INVENTION

The present disclosure relates to the field of heat sinks, and more particularly to heat sinks for circuitry, such as integrated circuits.

BACKGROUND

Transportation electrification drives improvements in system efficiency and power density. Inclusion of wide-bandgap (WBG) based semiconductor devices in power modules has shown to raise the power conversion efficiency, however, these devices still exhibit substantial power losses in a small volume. Conventional efforts have focused on removing the generated heat to be able to capture the benefits of advanced semiconductor materials as well as to improve the reliability of the operation for automotive applications. However, these conventional efforts have fallen short in removal heat.

SUMMARY

In general, one innovative aspect of the subject matter described herein can be a heat sink for extracting heat from circuitry during operation of the circuitry. The heat sink may include a solid, thermally conductive material including a first surface configured to be thermally coupled with circuitry. The heat sink may include a second surface opposing the first surface, where the second surface may be arranged to contact a cooling fluid. The heat sink may include a cover arranged and configured to encapsulate the cooling fluid between the cover and the second surface and form, in conjunction with the second surface, channels that cause the cooling fluid to flow along a flow direction. A cross-section of the second surface may be orthogonal to the flow direction and may be shaped in accordance with a linear combination of sinusoidal spatial harmonics, the linear combination including a total number of terms N that satisfies the conditions $2 \leq N \neq \infty$.

The foregoing and other embodiments can each optionally include one or more of the following features, alone or in combination. In particular, one embodiment includes all the following features in combination.

In some embodiments, the heat sink may be configured such that the total number of terms N satisfies the condition $N \leq 20$.

In some embodiments, the heat sink may be configured such that the terms of the linear combination have corresponding harmonic orders, and a maximum of the harmonic orders is 1000.

In some embodiments, the heat sink may be configured such that the solid, thermally conductive material includes one or more of Al or Cu.

In general, one innovative aspect of the subject matter described herein can be a power module including a substrate, circuitry disposed on the substrate, and a heat sink in accordance with an embodiment described herein, where the heat sink is disposed on the substrate and is thermally coupled with the circuitry.

The foregoing and other embodiments can each optionally include one or more of the following features, alone or in combination. In particular, one embodiment includes all the following features in combination.

In some embodiments, the power module may include a manifold fluidly connected to the channels of the heat sink and a source of the cooling fluid. The manifold may be configured to supply the cooling fluid, at a first temperature, from the source of the cooling fluid to the heat sink, and return the cooling fluid, at a second temperature larger than the first temperature, from the heat sink back to the source of the cooling fluid.

In some embodiments, the power module may be configured such that the cooling fluid includes one or more of water and glycol.

In some embodiments, the power module may be configured as a power-converter device, wherein the circuitry comprises Si or SiC-based power-electronic switches.

In general, one innovative aspect of the subject matter described herein can be a system for designing a heat sink that is liquid-cooled for cooling a power module. The system may include a data processing apparatus and memory encoding instructions that, when executed by the data processing apparatus, cause the system to perform operations including: (i) accessing parameters including (a) a size of the heat sink orthogonal to a flow direction, (b) one or more optimization objectives, and (c) one or more constraints that a combination of the power module and the heat sink must satisfy; (ii) accessing a design space for a cross-section of a surface of the heat sink that is shaped in accordance with a linear combination of sinusoidal spatial harmonics, where the linear combination includes a total number of terms N that satisfies the conditions $2 \leq N \neq \infty$, where the design space includes coefficients, spatial harmonics, and phases of the terms; (iii) initializing a population of heat-sink cross sections based on the accessed design space; (iv) iterating the following operations: (a) performing computational analyses of respective power-module and heat-sink combinations based on an instant population of cross-sections for the heat sink; (b) evaluating fitness of respective power-module and heat sink combinations based on the computational analysis of the instant population in view of the optimization objectives and the constraints; and (c) generating a new population by applying one or more genetic algorithm operators to the instant population evaluated for fitness; then (v) outputting an optimized population of cross sections including a set of optimal heat-sink cross sections; and (vi) selecting, based on a particular one of the optimization objectives, a cross section from among the set of optimal heat-sink cross sections to be used to fabricate the heat sink.

The foregoing and other embodiments can each optionally include one or more of the following features, alone or in combination. In particular, one embodiment includes all the following features in combination.

In some embodiments, the system may be configured such that the optimization objectives include one or more of a heat-sink cross section height, a heat-sink volume, or a coolant pressure drop across the heat sink.

In some embodiments, the system may be configured such that the constraints include one or more of a semiconductor-junction temperature, a heat-sink cross-section height, a heat-sink width, a heat-sink length, a heat-sink volume, a Reynolds number, or a coolant pressure drop across the heat sink.

In some embodiments, the system may be configured such that the computational analyses include FEA.

In some embodiments, the system may be configured such that the genetic algorithm operators include one or more of mutation, cross-over, selection, elitism, or diversity control.

In general, one innovative aspect of the subject matter described herein can be a heat sink for extracting heat from circuitry during operation of the circuitry. The heat sink may include a first surface configured to be thermally coupled with the circuitry, where a thermal profile is defined at least in part by a thermal coupling between the first surface and the circuitry. The heat sink may include a second surface opposing the first surface, where the second surface arranged to contact a cooling medium that flows in a flow direction along the second surface. A cross-section of the second surface that is orthogonal to the flow direction may be shaped in accordance with an adaptive function including one or more parameters; wherein the one or more parameters of the adaptive function are determined based on the thermal profile that is defined at least in part by the thermal coupling between the first surface and the circuitry.

The foregoing and other embodiments can each optionally include one or more of the following features, alone or in combination. In particular, one embodiment includes all the following features in combination.

In some embodiments, the heat sink includes a cover arranged and configured to encapsulate the cooling medium between the cover and the second surface. The cover may be configured to form, in conjunction with the second surface, channels that cause the cooling medium to flow along the flow direction.

In some embodiments, the heat sink may be configured such that the cooling medium is a cooling fluid.

In some embodiments, the heat sink may be configured such that the adaptive function is a linear combination of sinusoidal spatial harmonics, the linear combination including a total number of terms N that satisfies the conditions $2 \leq N \neq \infty$.

In some embodiments, the heat sink may be configured such that the cross-section of the second surface is substantially uniform along the flow direction of the cooling medium.

In general, one innovative aspect of the subject matter described herein can be a system for forming a heat sink capable of extracting heat from circuitry during operation of the circuitry. The system may include a data processing apparatus and memory that includes encoding instructions that, when executed by the data processing apparatus, cause the system to: (a) obtain a thermal coupling profile pertaining to a thermal coupling between the circuitry and a first surface of the heat sink; (b) define a cross-section of a second surface of the heat sink that is opposite the first surface, the second surface being operable to contact a cooling medium that flows in a flow direction that is orthogonal to the cross-section, the cross-section defining a thermal performance profile for transfer of heat from the first surface to the second surface, where the thermal performance profile is dependent on the thermal coupling profile between the circuitry and the first surface of the heat sink; and (c) iteratively adjust the cross-section of the second surface in accordance with an adaptive function including one or more parameters by varying the one or more parameters to yield a thermal performance profile of the heat sink that satisfies one or more criteria.

The foregoing and other embodiments can each optionally include one or more of the following features, alone or in combination. In particular, one embodiment includes all the following features in combination.

In some embodiments, the system may be configured such that the encoding instructions cause the system to generate a plurality of layers each defined by the cross-section, where the plurality of layers yield the second surface, and where the second surface is substantially uniform along the flow direction of the cooling medium.

In some embodiments, the system may be configured such that the one or more criteria include (A) a size of the heat sink orthogonal to the flow direction, (B) one or more optimization objectives, and (C) one or more constraints that a combination of the circuitry and the heat sink must satisfy.

In some embodiments, the system may be configured such that the adaptive function is a linear combination of sinusoidal spatial harmonics, where the linear combination includes a total number of terms N that satisfies the conditions $2 \leq N \neq \infty$, where the one or more parameters includes coefficients, spatial harmonics, and phases of the terms.

In some embodiments, the system may be configured such that the encoding instructions cause the system to initialize a population of cross sections.

In some embodiments, the system may be configured such that the encoding instructions cause the system to iteratively adjust the cross-section of the second surface by iterating the following operations: (i) performing computational analyses of respective circuitry and heat-sink combinations based on an instant population of cross sections; (ii) evaluating fitness of respective circuitry and heat-sink combinations based on the analyzed instant population in view of the one or more criteria; (iii) generating a new population of cross sections by applying one or more genetic algorithm operators to the instant population evaluated for fitness; (iv) outputting an optimized population of cross sections including a set of optimal heat-sink cross sections; and (v) selecting, based on the one or more criteria, a cross section from among the set of optimal heat-sink cross sections to be used to fabricate the heat sink.

In some embodiments, the system may be configured such that one or more criteria include optimization objectives that include one or more of a heat-sink cross section height, a heat-sink volume, or a coolant pressure drop across the heat sink.

In some embodiments, the system may be configured such that the one or more criteria include one or more of a semiconductor-junction temperature, a heat-sink cross-section height, a heat-sink width, a heat-sink length, a heat-sink volume, a Reynolds number, or a coolant pressure drop across the heat sink.

In some embodiments, the system may be configured such that the computational analysis includes FEA.

In some embodiments, the system may be configured such that the one or more genetic algorithm operators including one or more of mutation, cross-over, selection, elitism, and diversity control.

In some embodiments, the system may be configured such that the cooling medium is a cooling fluid.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DESCRIPTION

Figure 1:
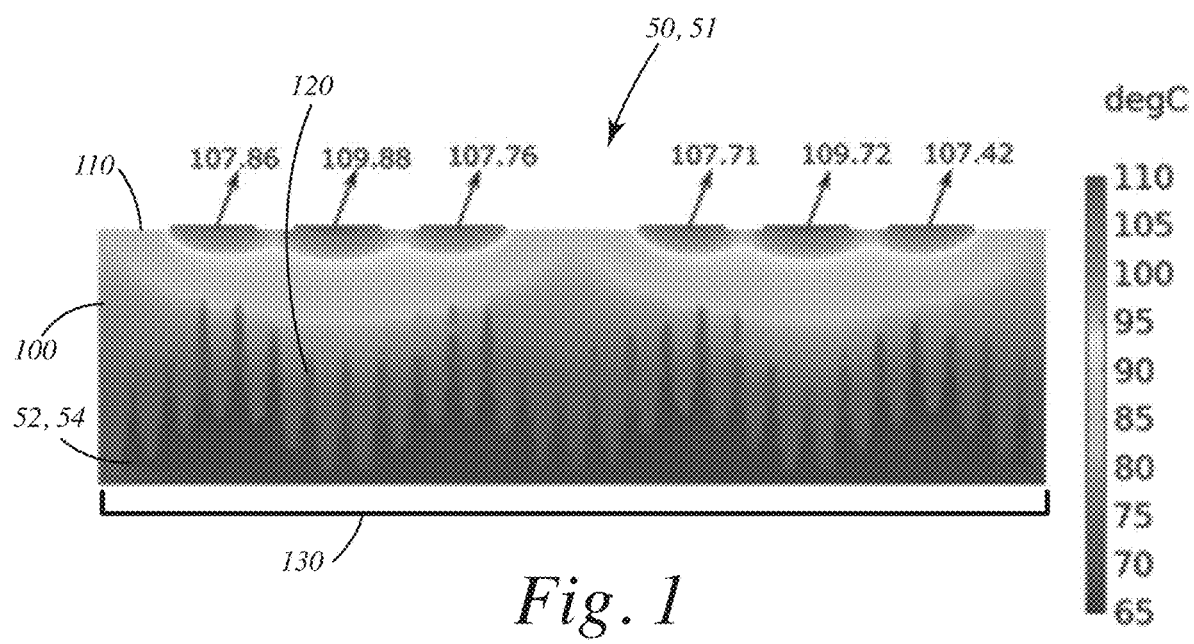
FIG. 1 shows a heat sink generated in accordance with one embodiment of the present disclosure.

The present disclosure is directed to a heat sink system for circuitry that facilitates removal of heat from the circuitry, such as a power module. To improve power density of power modules, not only electrical but also thermal optimization may be carried out as the two subsystems closely interact with each other. Wide bandgap (WBG) devices incorporated into power modules have become more prevalent in high power density applications primarily because these WBG devices are considered efficient in power conversion and generate heat and small volume. To further increase the power density, a system may decrease power module size or increase power conversion, or both.

In one embodiment, a multi-objective thermal analysis may be conducted by a heat sink generator for generating a heat sink in conjunction with a high power density circuit. The analysis may involve one or more generation algorithms, such as a derivative/gradient/hessian computational algorithm or an evolutionary algorithm. The one or more generation algorithms may be configured for optimization with respect to the heat sink construction. One type of evolutionary algorithm is a population-based evolutionary optimization algorithm. The population-based evolutionary optimization algorithm may not involve derivative computation, which may yield instability. Additionally, the population-based evolutionary optimization algorithm may enable inclusion of constraints that are linear, piecewise, or nonlinear. A heat sink generation algorithm in accordance with one embodiment, such as the population-based evolutionary optimization algorithm, may also be less susceptible to being trapped at a local minima, less susceptible to being trapped at a local extrema, or may avoid gradient computation, or any combination thereof.

In one embodiment according to the present disclosure, a cooling medium in the form of liquid may be employed. This type of cooling medium is often used in automotive applications, where high power density modules and thermal management are considered. A liquid cooling configuration may enable rapid extraction of heat generated by WBG devices and facilitate maintaining device operational integrity.

In one embodiment, a method for design of a liquid-cooled heat sink is provided for power electronic modules. A geometrical representation of the heat sink construction may be based on a Fourier-analysis. This geometrical representation may be used to generate a heat sink construction for the power electronics module, or any other type of circuitry. The geometrical representation based on a Fourier-analysis may describe the geometry of a complex heat sink using a reduced number of parameters or Fourier terms. The power module structure may also be described in a representative manner in conjunction with the geometrical representation of the heat sink, and an evolutionary algorithm may be employed to optimize the heat sink.

In one embodiment, the method may include determining a number of Fourier terms and their associated design space. The method may also include providing these Fourier terms into a geometry-creation system to generate the heat-sink geometry. This geometry may be supplied to a Finite Element Analysis (FEA) system to evaluate its cooling performance. The output of the cooling performance analysis may then be used by an evolutionary algorithm to optimize the heat sink. A genetic algorithm may be selected as the evolutionary algorithm to carry out a constrained multi-objective enhancement, potentially an optimization, of the heat sink.

A system in accordance with one embodiment may be configured to create heat sink geometries using a Fourier-based design system, and optimize the heat sink geometries with respect to considered objectives by employing machine learning (e.g., artificial intelligence) for geometry enhancement or optimization. The system can be utilized to create enhanced or optimal heat sinks that are suitable for conventional manufacturing methods, such as extrusion and casting, as well as additive manufacturing methods.

A system and method in accordance with one embodiment may facilitate creating high power density wide-bandgap based power electronics.

The system and method may be provided for generating a heat sink in a variety of applications, including for instance, in automotive and other applications in the field of transportation. As another example, the system and method may be provided for generating a heat sink in commercial power electronic modules and other applications in the field of energy and utilities.

I. System Overview

Figure 22:
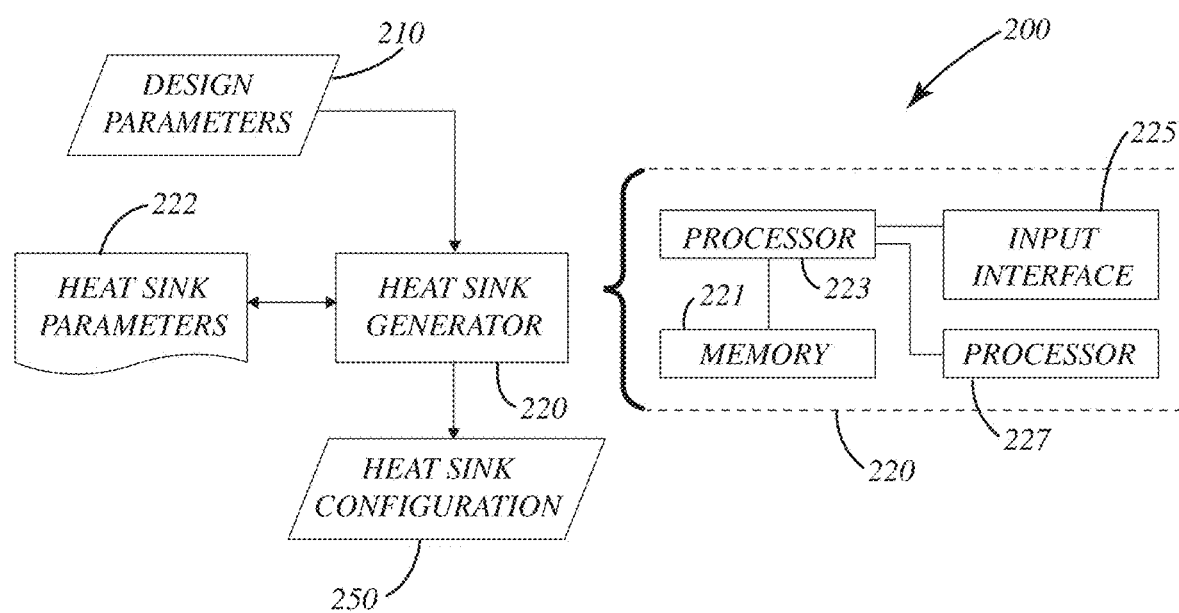
FIG. 22 shows a heat sink generator in accordance with one embodiment of the present disclosure.

A system in accordance with one embodiment is shown in FIG. 22 and generally designated 200. The system may include a heat sink generator 220 operable to receive design parameters 210 for a heat sink and to generate and store heat sink parameters 222, which can be adapted in accordance with one more embodiments described herein. The heat sink generator 220 may be operable to generate a heat sink configuration 250 for circuitry, such as an integrated circuit. The integrated circuitry may be a power module as described herein, including Si or SiC-based-power-electronic switches. The circuitry may include any type of semiconductor-based power devices, or any combination of different types of semiconductor-based power devices. Example types of semiconductor-based power devices include Si and SiC (as identified previously) as well as GaN, GaO2, and Diamond.

The heat sink generator 200 in the illustrated embodiment may include one or more of the following: a processor 223, memory 221, an input interface 225, and an output interface 227. The input interface 225 may include one or more input communication interfaces, including, for example, wired communication and wireless communication capabilities. Likewise, the output interface 27 may include one or more output communication interfaces, including at least one wired interface and at least one wireless interface, or any combination thereof. The processor 23 and memory 21 may be configured to generate a heat sink configuration according to one or more processes described herein. The memory 21 may store encoded instructions for directing the processor 23 in accordance with one or more embodiments described herein.

The heat sink generator 220 may be coupled to one or more components of the system 200 to achieve operation in accordance with the described functionality and methodology.

The heat sink generator 220 may include any and all electrical circuitry and components to carry out the functions and algorithms described herein. Generally speaking, the heat sink generator 220 may include one or more microcontrollers, microprocessors, and/or other programmable electronics that are programmed to carry out the functions described herein. The heat sink generator 220 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in system 200, or they may reside in a common location within the system 200. When physically distributed, the components may communicate using any suitable serial or parallel communication protocol, such as, but not limited to, CAN, UN, FireWire, I2C, RS-232, RS-485, and Universal Serial Bus (USB).

II. Heat Sink

Figure 2:
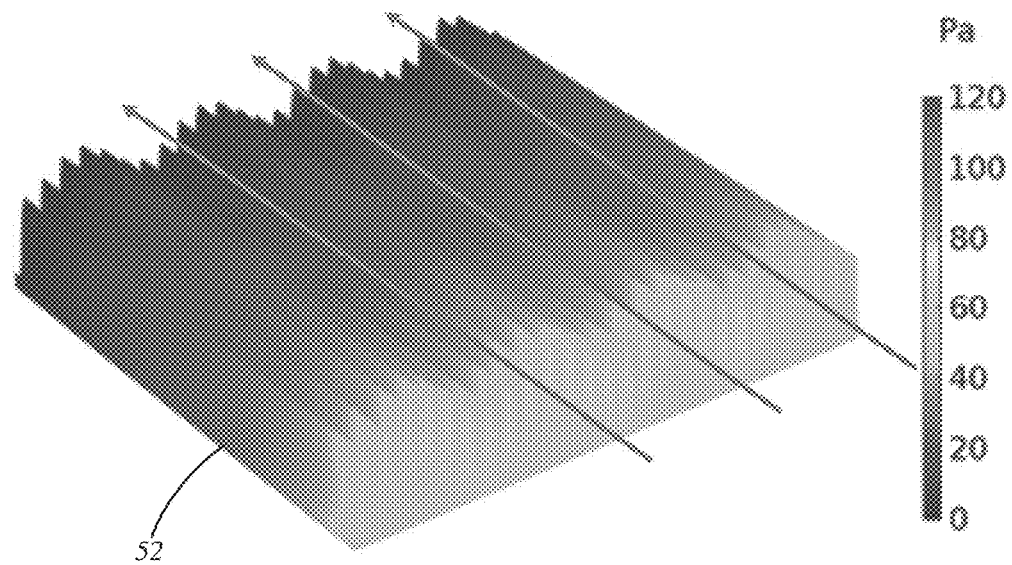
FIG. 2 shows pressure drop of a cooling medium in conjunction with the heat sink of FIG. 1.
Figure 3:
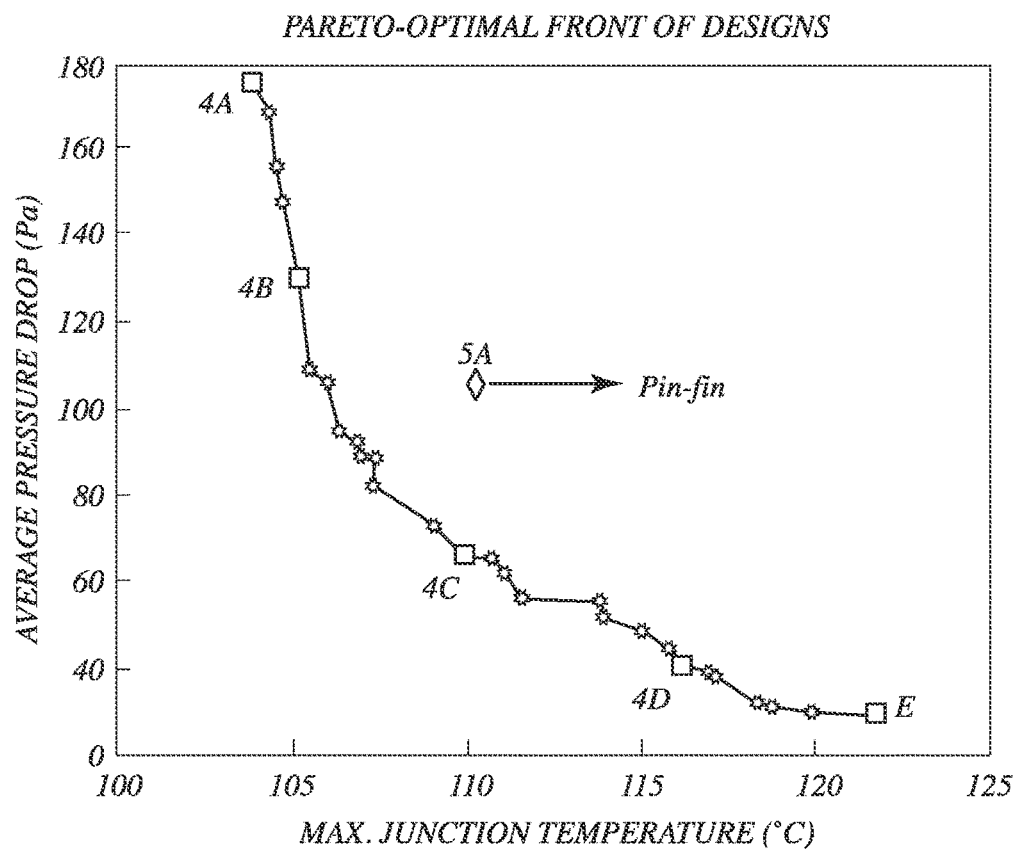
FIG. 3 shows a Pareto-optimal front of candidate heat sinks generated in accordance with one embodiment of the present disclosure.
Figure 4A:
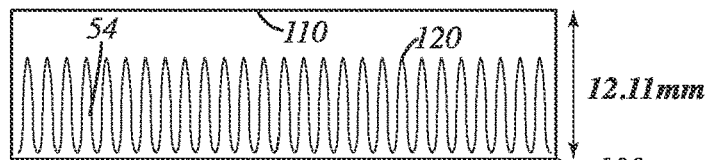
FIG. 4A shows a candidate heat sink identified in FIG. 3.
Figure 4B:
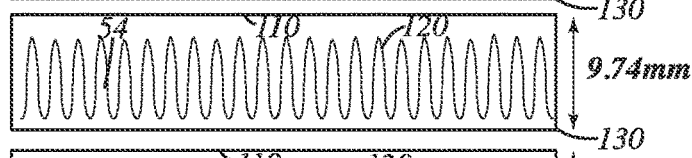
FIG. 4B shows a candidate heat sink identified in FIG. 3.
Figure 4C:
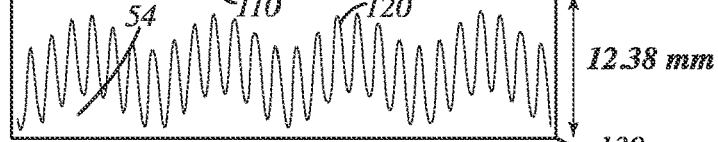
FIG. 4C shows a candidate heat sink identified in FIG. 3.
Figure 4D:
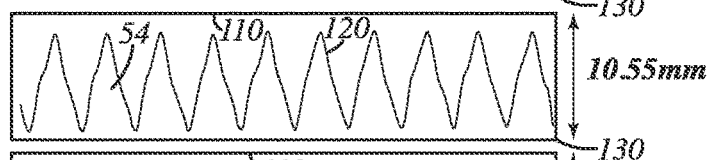
FIG. 4D shows a candidate heat sink identified in FIG. 3.
Figure 4E:
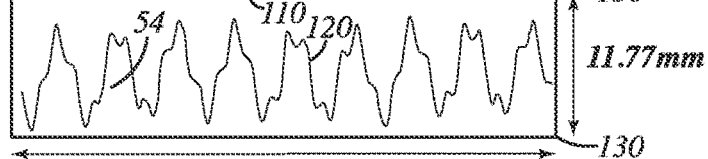
FIG. 4E shows a candidate heat sink identified in FIG. 3.
Figure 6:
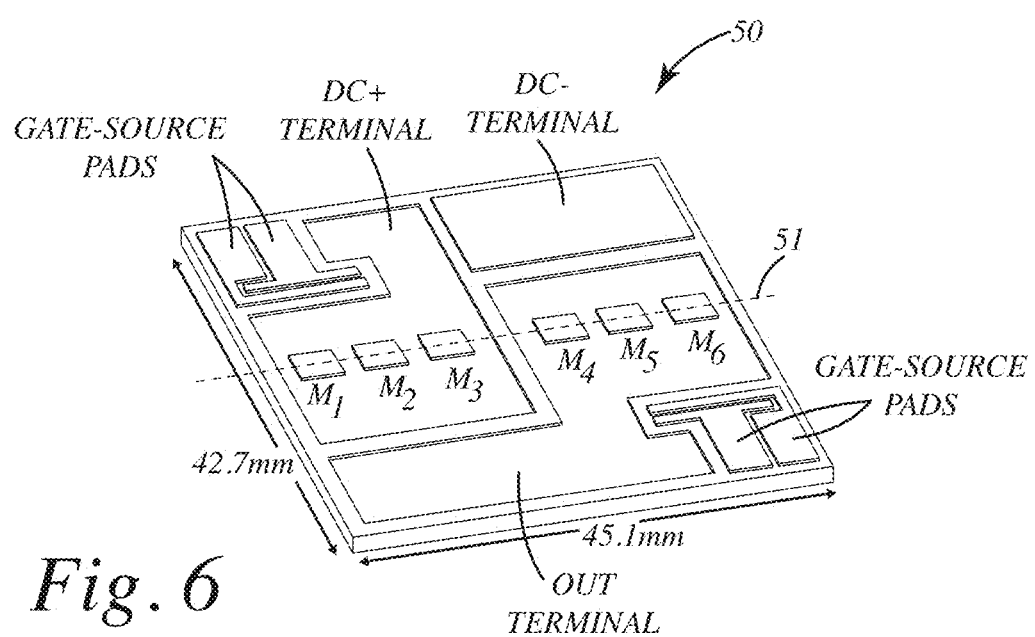
FIG. 6 shows circuitry in accordance with one embodiment of the present disclosure.

A heat sink in accordance with one embodiment is shown in FIGS. 1-2 and 6, and generally designated 100. The heat sink 100 includes a first surface 110 configured to be thermally coupled to an integrated circuit 50. The integrated circuit 50 may be any type of circuitry and is not limited to integrated circuitry. The heat sink 100 may include a second surface 120 opposing the first surface 110 and arranged to contact a cooling medium 52, such as a cooling fluid in the form of water and/or glycol. A cover 130 may be provided as an optional component where the heat sink 100 is configured to provide a closed channel for the cooling medium 52, such as in the case where the cooling medium 52 is a cooling fluid that flows through a channel 54 defined between the cover 130 and the second surface 120 of the heat sink 100.

The cooling medium 52 may vary depending on the application and is not limited to a fluid. The cooling medium 52 may be any type of medium or a combination of mediums, including any type or combination of liquids and any type or combination of gases, or a combination thereof. For instance, the cooling medium 52 may be primarily in the form of a gas (e.g., atmospheric gas or air) flowing over the second surface 120.

In one embodiment, the cover 130 may be present, and a cooling system having a manifold that directs the cooling medium 52 to and from the channel 54 defined between the cover 130 and the second surface 120 of the heat sink 100. The cooling medium 52 may be supplied from an outlet of the manifold to the channel 54 at a first temperature and returned to an inlet of the manifold from the channel 54 at a second temperature greater than the first temperature.

The integrated circuit 50 may include one or more heat sources, which are thermally coupled to and transfer heat to the first surface 110 of the heat sink 100. A heat transfer profile may be determined along a reference section 51 of the integrated circuit 50 and the heat sink 100. This heat transfer profile may form at least a part of the basis for generating a surface structure of the second surface 120 of the heat sink 100 to facilitate dissipation of heat generated by the integrated circuit 50.

As depicted in FIG. 6, the integrated circuit 50 may include more than one heat source (e.g., components), some of which may intersect the reference section 51 and others of which may not intersect the reference section 51. In the illustrated embodiment, heat sources of the integrated circuit 50 that do not intersect the reference section 51 may be left out of the analysis used by the heat sink generator 200 to generate the heat sink 100. This approach may be considered sufficient for purposes of generating the heat sink 100 because such heat sources not intersecting the reference section 51 may be considered to have negligible or little heat relative to the heat sources that intersect the reference section 51. In an alternative embodiment, the heat sink generator 200 may obtain a heat transfer gradient for all or a portion of an area of thermal coupling between the integrated circuit 50 and the first surface 110.

The circuitry 50, as described herein, may be formed in a variety of ways, including, for example, as an integrated circuit or as a printed circuit board assembly including one or more integrated circuits disposed thereon. The circuitry 50, in one embodiment may include power electronics having increased power density and reliability in accordance with DOE ELT 2025 targets, such as 100 kW/L, and 300,000 mile lifetime. The substrate and interconnect configurations of the power module may allow for increased power density and enhance reliability for wide bandgap device constructions. Such constructions generate a significant amount of heat, which can be extracted in accordance with one embodiment described herein. The circuitry 50 may include enhanced thermal and power cycling capabilities, as well as low electrical parasitic and integrated gate driver, sensor and protection configurations.

In one embodiment, the heat sink 100 may be generated for a specific construction or design constraints, or both, of the circuitry 50. Generation of the heat sink 100 may be based on heat generation of individual components of the circuitry 50, such as the components modeled with respect to the heat transfer profile for the reference section 51 in the illustrated embodiment. The heat sink 100 may be generated using an evolutionary based algorithm, which may be configured for optimization. This type of heat sink generation may be computationally efficient relative to conventional techniques.

III. Heat Sink Generation and Evaluation

Figure 11:
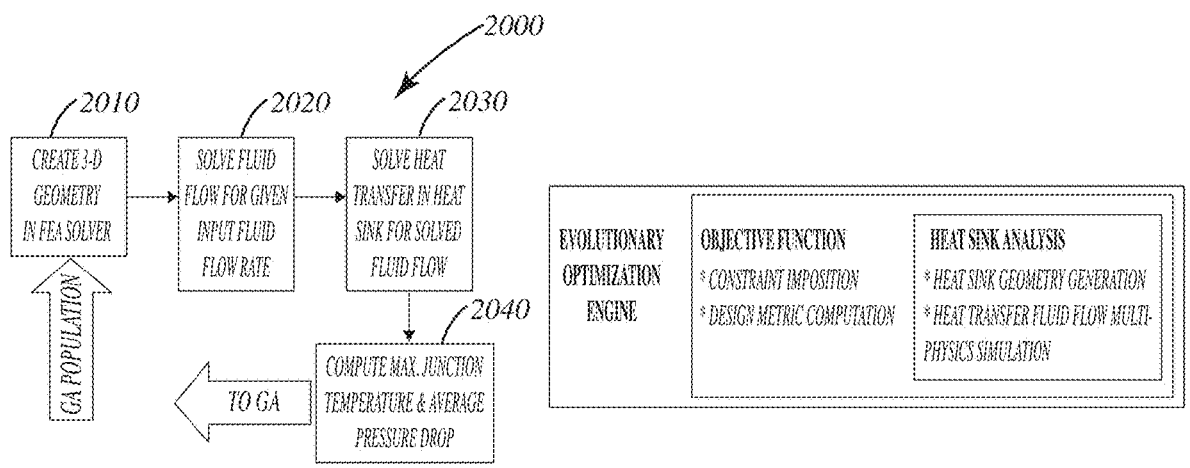
FIG. 11 shows a method of generating a heat sink in accordance with one embodiment.
Figure 12:
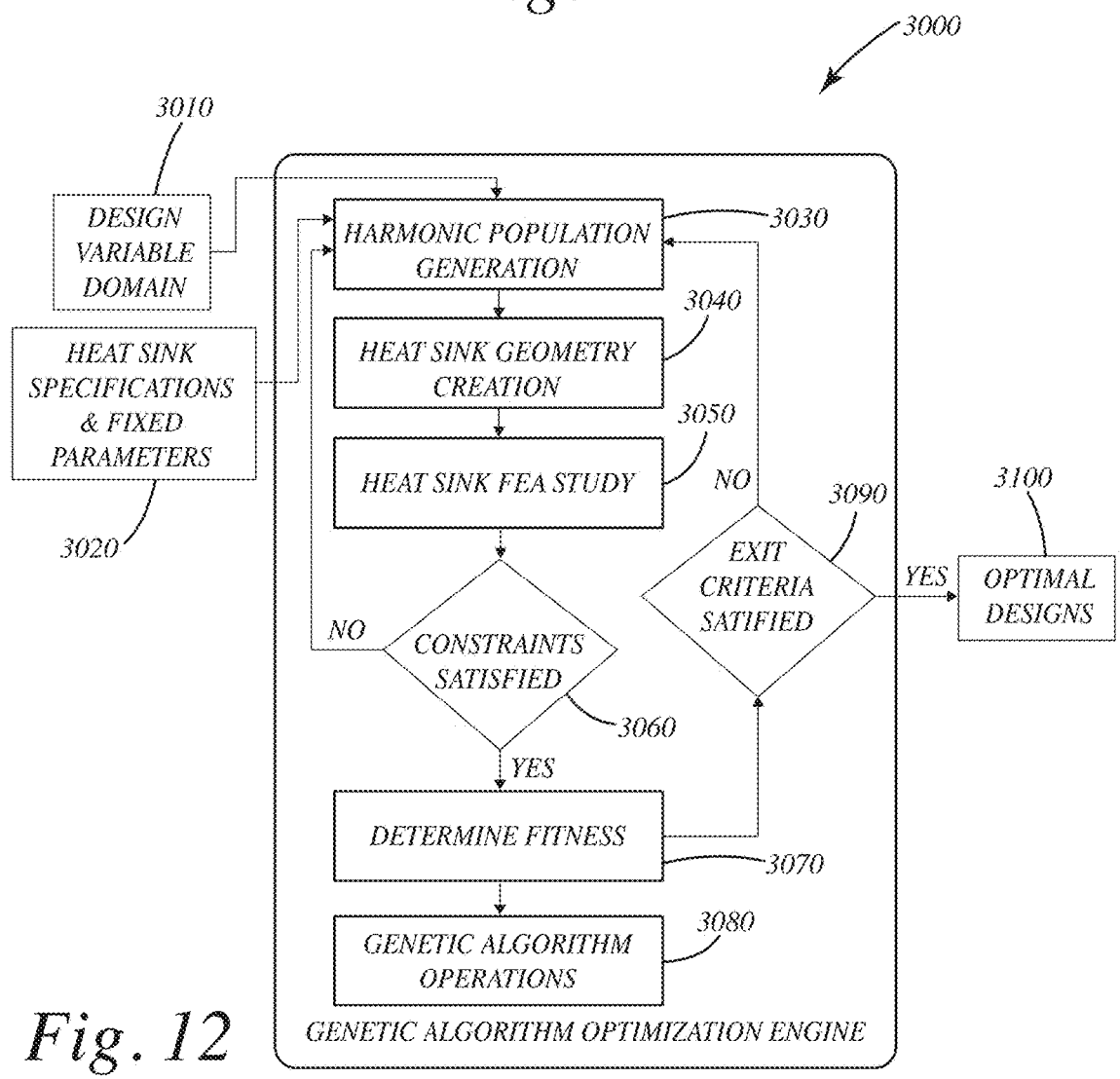
FIG. 12 shows a method of generating candidate heat sinks for evaluation in accordance with one embodiment.

A method of generating and evaluating a heat sink 100 in accordance with one embodiment is shown in FIG. 11 and generally designated 2000. The method may involve evaluating a 3D geometry in a finite element analysis solver. Step 2010. In one embodiment, a significant number of heat sink candidates may be provided for a design space, and a heat sink generation algorithm (e.g., an evolutionary algorithm, such as a genetic algorithm (GA)) may be used to generate, potentially optimize, candidate heat sink solutions that satisfy one or more criteria. The heat sink evaluation algorithm may be based on an objective function (e.g., constraint imposition and design metric computation) in conjunction with heat sink analysis that involves geometry creation and heat transfer fluid flow multi-physics simulations. The heat sink generation algorithm may be implemented as an evolutionary algorithm by the method 3000 depicted in illustrated embodiment of FIG. 12, which may enable multi-objective design optimization or enhancement. The output of the method 3000 may be provided, iteratively, to the method 2000 such that the method 2000 and method 3000 may interact with each other to evaluate heat sinks and generate heat sink configurations and to ultimately yield one or more heat sinks 100 considered best among the candidate heat sink configurations.

The method 2000 for generating the heat sink 100 may include solving fluid flow for a given input fluid flow rate. Step 2020. For instance, in the illustrated embodiment of FIG. 2, fluid pressure is shown for a given flow rate for the heat sink 100 shown in the illustrated embodiment of FIG. 1. In one embodiment, solving fluid flow for a given input fluid flow rate may involve reducing or minimizing a maximum junction temperature of the heat sources and minimizing or reducing cooling pressure drop, while satisfying physical constraints. The method 2000 for generating the heat sink 100 may also include solving heat transfer for a heat sink with respect to the salt fluid flow, and computing a maximum junction temperature and average pressure drop for the heat sink 100 relative to the circuitry 50. Steps 2030, 2040. This information may be provided as design variables and part of the design variable domain 3010 of the method 3000 for further generation of candidate heat sinks for evaluation by the method 2000.

The method 3000 in the illustrated embodiment for generating one or more candidate heat sinks may include a design variable domain 3010 and a fixed variable domain 3020 (e.g., heat sink specifications and fix parameters) provided as input to a harmonic population generator. Step 3030. As described herein, the design variable domain 3010 may receive information from an external evaluator, such as the information received based on evaluation of heat sink candidates in accordance with the method 2000.

The harmonic population generation according to step 3030 may be provided for creation of heat sink geometries (e.g., candidate heat sink configurations). Step 3040. The heat sink geometries may be analyzed in accordance with a heat sink finite element analysis to determine if constraints are satisfied. Steps 3050, 3060. If the constraints and criteria are not satisfied, the process may be repeated until such constraints are satisfied. The constraints and criteria may include maximum junction temperature, pressure drop, Reynolds number and thermal resistance difference between devices on the same substrate. For the finite element analysis, flow of the cooling medium 54 may be assumed to be fully developed laminar, and coolant properties may be assumed to be temperature invariant. It is to be understood that these assumptions may be withdrawn, and aspects of the cooling medium 54 such as the laminar flow and temperature invariant may be modeled or taken into account by the finite element analysis. Constraints considered during the finite element analysis may include a Reynolds number less than 1800 and a semiconductor junction temperature less than a $T_{j,max}$.

If the method 3000 determines the constraints are satisfied, next fitness and genetic algorithm operations may be conducted. Step 3070, 3080. The method 3000 may determine whether one or more exit criteria have been satisfied based on output of the genetic algorithm operation. Step 3090. If the exit criteria have been satisfied, the one or more heat sink candidate designs or configurations may be output for evaluation in accordance with one or more embodiments described herein.

Figure 5A:
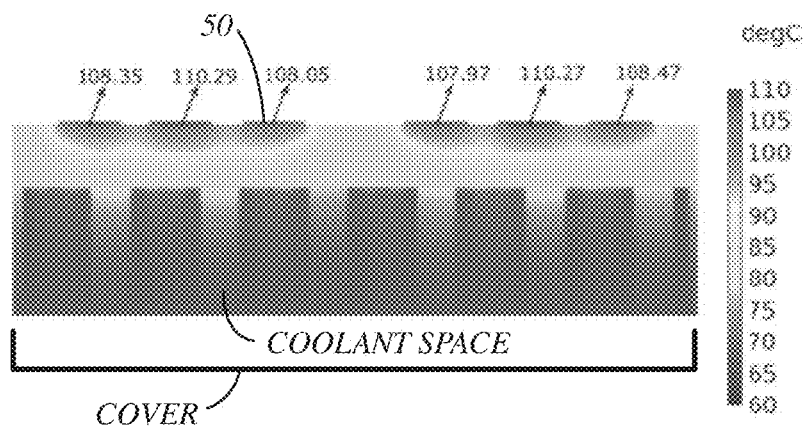
FIG. 5A shows a pin-fin heat sink.
Figure 5B:
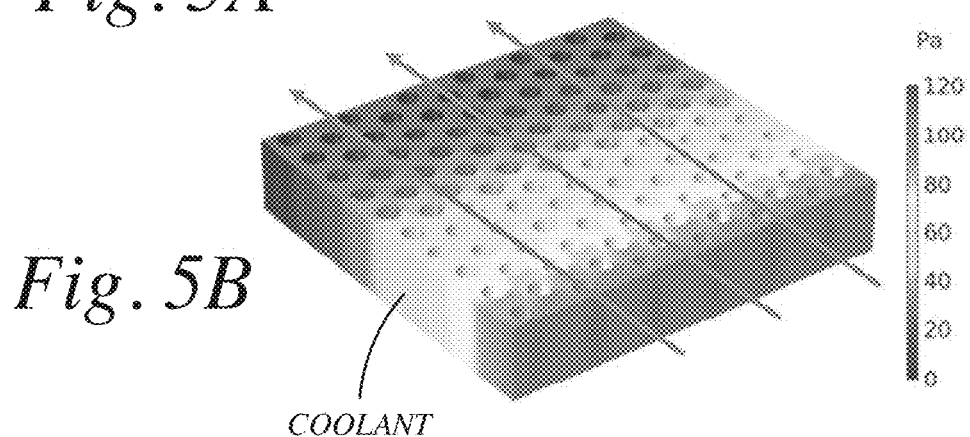
FIG. 5B shows a pressure drop of a cooling medium in conjunction with a heat sink of FIG. 5A.

In the illustrated embodiments of FIGS. 3 and 4A-E, of plurality of candidate heat sinks are generated and evaluated in accordance with one or more methods described herein, including the methods 2000 and 3000. The maximum junction temperature in the illustrated embodiments is determined for heat sources of circuitry 50 in the form of SiC MOSFETS. As described herein, the number and type of heat sources may vary from application to application. The average pressure drop across each heat sink candidate is also identified for performance evaluation. For contrast, performance information for a conventional pan-fin heat sink is shown in conjunction with the candidate heat sinks depicted in the illustrated environment of FIGS. 4A-E. For purposes of disclosure, the conventional pin-fin construction is depicted in further detail in FIGS. 5A-B. This conventional pan-fin construction is tailored for uniform cooling with a generally uniform structure, and as can be seen, is less efficient for heat extraction relative to a heat sink 100 generated in accordance with one embodiment. For instance, as can be seen in the illustrated embodiment of FIG. 3, a heat sink 100 generated in accordance with one embodiment of the present disclosure may yield at least a 50% reduction in pressure drop (or heat sink volume) relative to the conventional pan-fin construction of FIG. 5.

Figure 7:
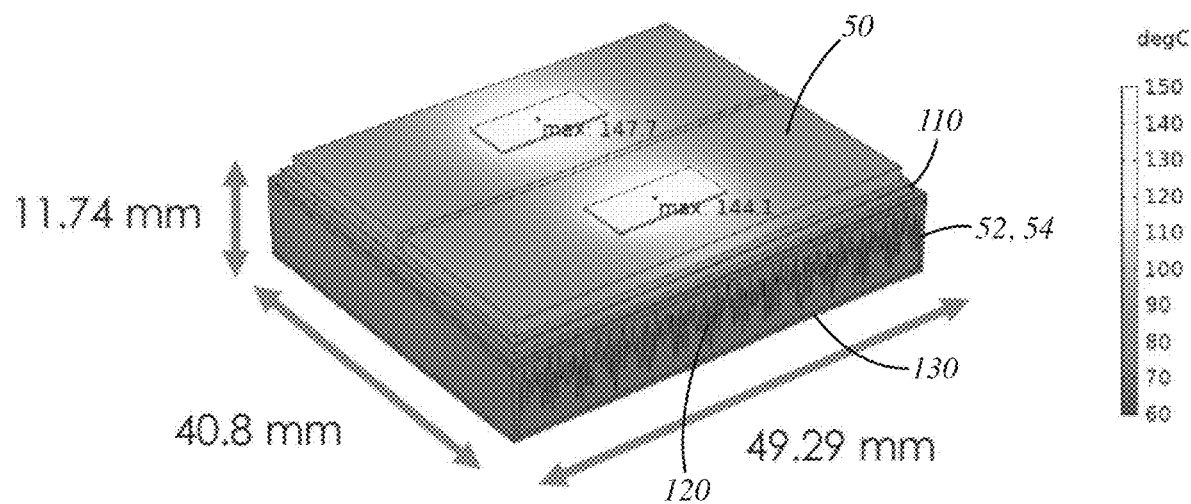
FIG. 7 depicts a thermal profile of a heat sink generated in accordance with one embodiment.
Figure 8:
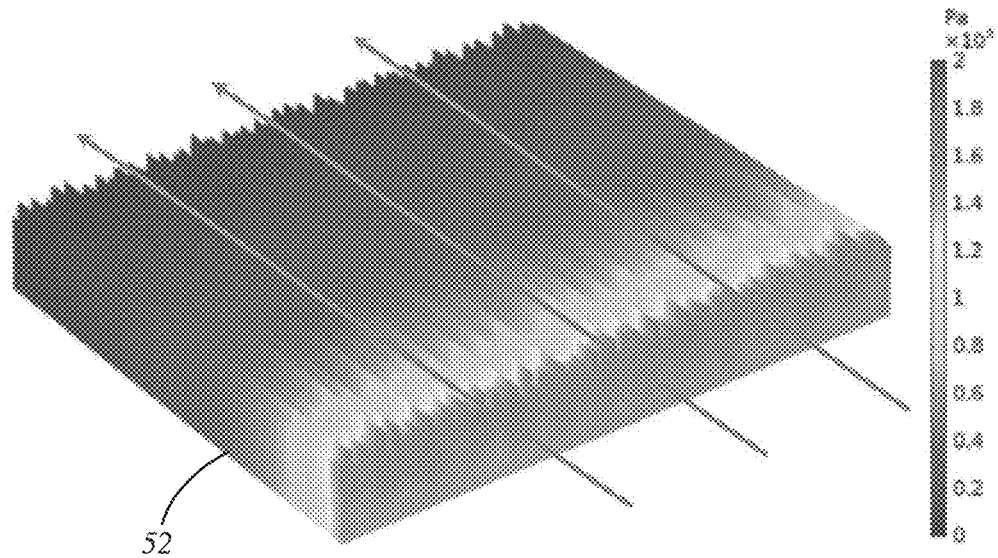
FIG. 8 shows a pressure drop of a cooling medium in conjunction with the heat sink of FIG. 7.
Figure 9:
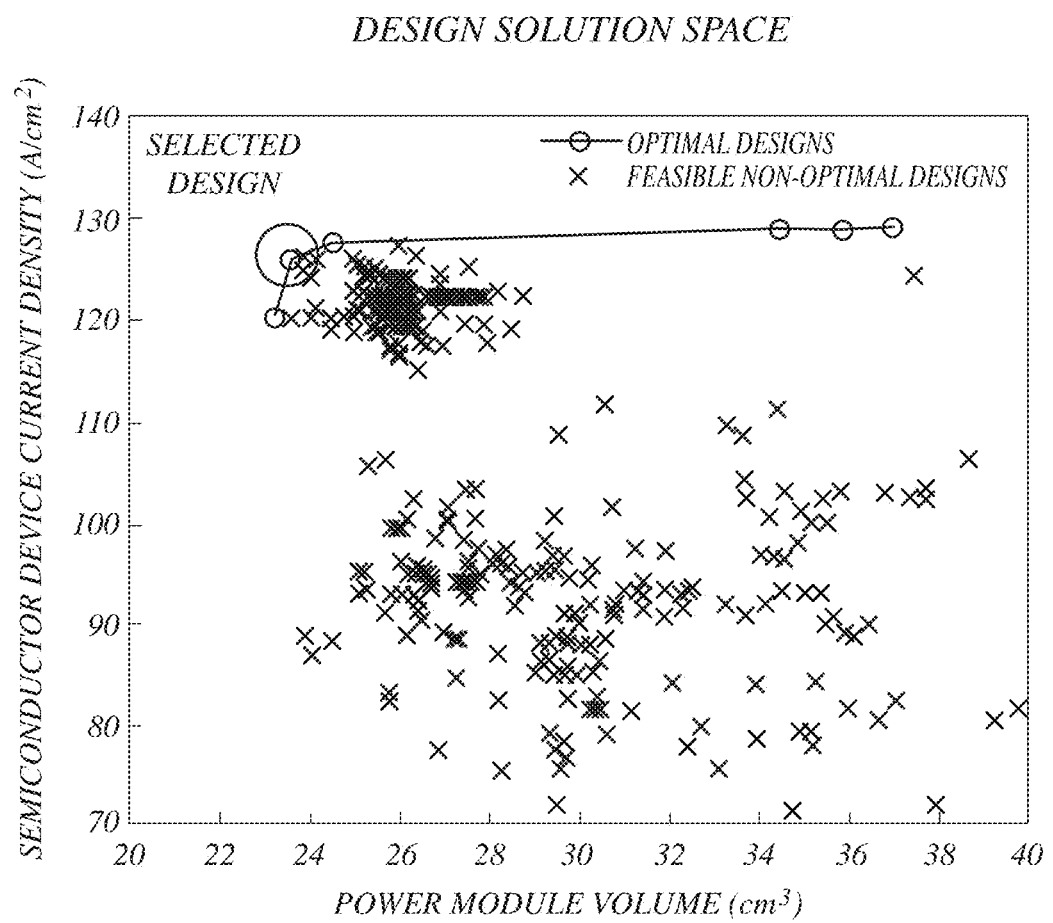
FIG. 9 shows a design space of a plurality of candidate heat sinks generated in accordance with one embodiment of the present disclosure.

In the illustrated embodiments of FIGS. 7-9, a heat sink 100 in accordance with one embodiment is generated and depicted relative to performance criteria. A heat sink 100 generated in accordance with one embodiment of the present disclosure is shown in FIG. 7, as well as in FIG. 9 among a plurality of other heat sink candidates. The heat sink 100 in the illustrated embodiment may be generated with respect to circuitry in the form of a multilayer organic direct bonded copper (ODBC) substrate. The heat sink 100 in this configuration may be an integrated heat sink generated in accordance with one or more embodiments described herein based on an evolutionary algorithm (e.g., a genetic algorithm) where a GaN HEMT current density and power module volume are provided as optimization parameters.

The heat sink evaluation algorithm (e.g., an evolutionary algorithm), in one embodiment, may be configured to evaluation configurations or constructions for both the heat sink 100 and the circuitry 50. For instance, the evolutionary algorithm may be configured to optimize top copper thickness of the circuitry 50, a module width of the circuitry 50, and the heat sink 100. With this approach, a compact structure, including a compact heat sink structure, may be developed with thermal performance and pressure drop being compliant with respective thermal performance and pressure drop criteria.

Figure 10:
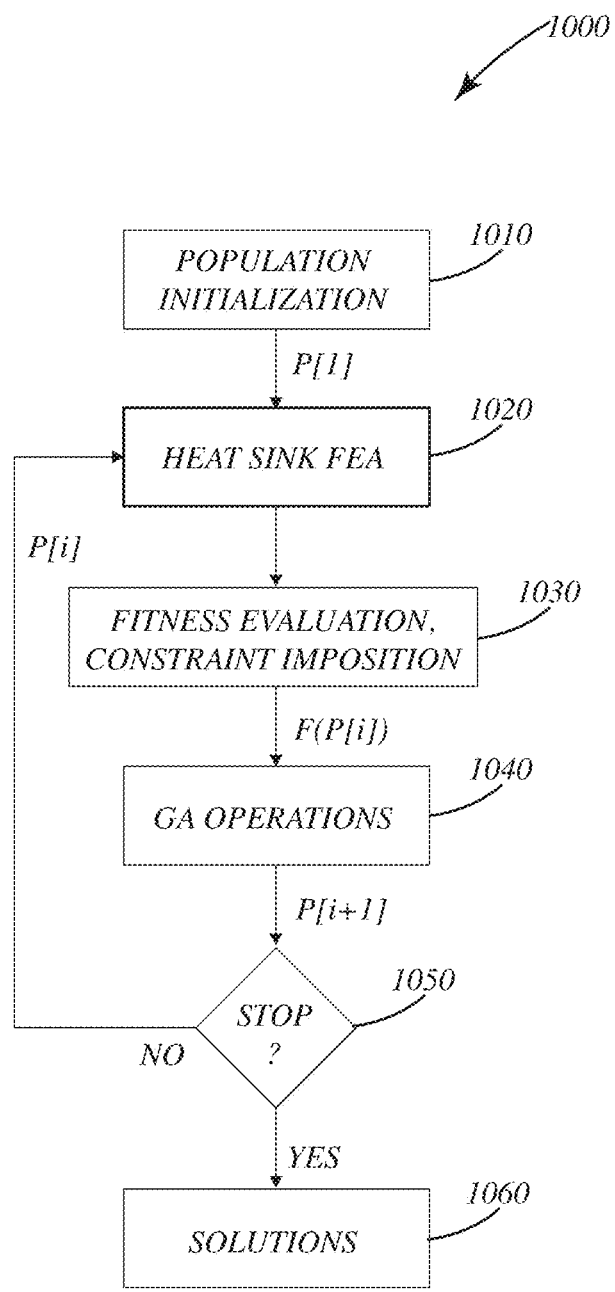
FIG. 10 shows a method of generating a heat sink in accordance with one embodiment.

An alternative method of evaluating heat sink candidates and generating a heat sink 100 depicted in the illustrated embodiment of FIG. 10 and generally designated 1000. The method 1000 may be similar to the methods 2000 and 3000 in several respects, including providing input to a heat sink generation algorithm in accordance with one or more embodiments described herein and capable of generating one or more candidate heat sinks. The method 1000 may include generating an initial population of heat sink candidates and evaluation of the heat sink candidates, which may be conducted by a finite element analysis of the heat sink candidates. Steps 1010, 1020. The method 1000 may utilize a current or initial population of heat sink candidates and their associated evaluations to determine a future population of candidate heat sinks. The output of the evaluation may be provided for determining fitness and constriction imposition. Step 1030. The output of the fitness and constriction imposition may be evaluated according to a heat sink evaluation algorithm, such as an evolutionary algorithm (e.g., a genetic algorithm), to operate in conjunction with a heat sink generation algorithm to yield additional heat sink candidates. Step 1040. Example genetic algorithms include one or more operators, such as mutation, crossover, selection, elitism, and diversity control.

These additional heat sink candidates, optionally in conjunction with the previous heat sink candidates, may be evaluated, and fitness and constriction imposition may be determined for the evaluated heat sink candidates. Steps 1040, 1050, 1020, 1030. This process may be conducted iteratively until a heat sink candidate is identified as being compliant with one or more criteria for use as the heat sink 100. Steps 1050, 1060.

Figure 13:
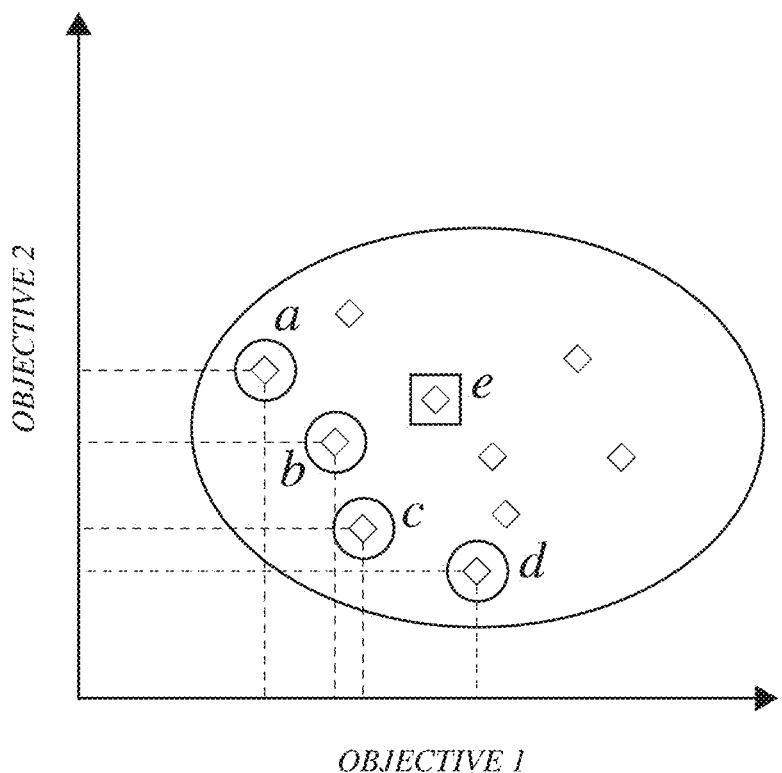
FIG. 13 shows a Pareto-optimal front analysis relative to two objectives in accordance with one embodiment.

As described herein, sink candidates may be generated and evaluated by a population evaluator, such as a genetic algorithm, and constrained multi-objective optimization. Optimization may yield a solution that satisfies one or more objective criteria or goals. Such an analysis can be conceptualized in accordance with the illustrated embodiment of FIG. 13, with first and second objectives. It is to be understood that additional objectives may be utilized in practice. It is noted that non-contracting objectives may essentially reduce optimization goals. A solution for a set of designs may be Pareto-front. Constrained imposition may enable the system to reject non-viable configurations, and reduce the solution space.

The heat sink 100 may be represented by a parameterized function in accordance with one embodiment. The function may include a plurality of adjustable parameters that may define the second surface 120. The number and values of the parameters may be varied to yield a second surface 120 that facilitate heat transfer from a heat load (in the form of circuitry 50) to a cooling medium 54.

In generating a structural design based on a parameterized function, the number of parameters, which may represent design variables for the structure, may be infinite A population evaluator, such as an evolutionary algorithm, may rely on the quality of a population for time-efficient analysis (e.g., time-efficient optimization), and a completely random population can lead to a computationally inefficient or sub-optimal solution. A parameterized function in accordance with one embodiment may be capable of defining the second surface 120 in a compact manner with a computationally efficient number of parameters. An example of such a parameterized function that is compact is a Fourier series, which can generate heat sink profiles with relatively few variables (Fourier parameters). The Fourier series includes at least one type of parameterized function within operable within sinusoidal orthogonal space, which is considered compact.

The present disclosure is not limited to a Fourier series or a function operable within sinusoidal orthogonal space. Additional or alternative functions and functional spaces that are compact may be utilized. For instance, a functional space operable within an orthogonal space may be utilized, where a geometry may be represented as a linear combination of orthogonal functions.

Figure 14:
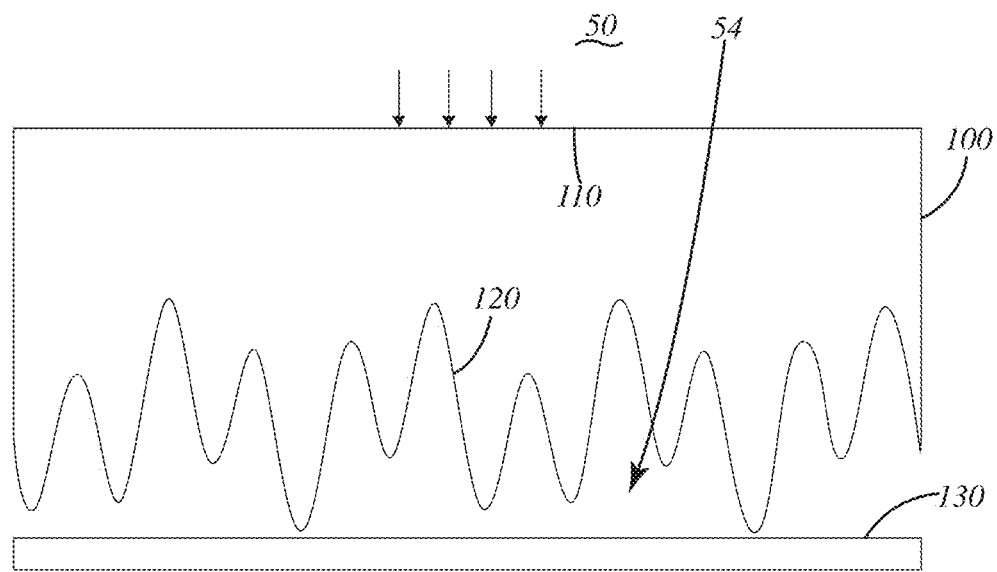
FIG. 14 shows a candidate heat sink in accordance with one embodiment.

In the illustrated embodiment of FIG. 14, the parameterized function may be provided in the form of a Fourier series representation of the second surface 120 along the reference section 51 of the heat sink 100. The Fourier series may include a plurality of parameters that can be adjusted to yield a variety of surface configurations for the second surface 120. In the illustrated embodiment, the second surface 120 along the reference section 51 of the heat sink 100 may be substantially uniform along a direction transverse to the reference section 51 and parallel with the flow direction of the cooling medium 52. As a result, the parameterized function may define a 2-D curved line, which in turn defines the second surface 120, that can be varied in accordance with the plurality of parameters. For instance, in the illustrated embodiment of FIG. 14, the second surface 120 is defined by a Fourier series represented as a summation of Fourier series harmonics. As described herein, the second surface may be fixed along the length of the coolant path. The number and/and values of the parameters (e.g., variables corresponding to the number of harmonics of the Fourier series) may be varied to change the structure of the second surface 120. For instance, the second surface 120 may be defined according to the function:

$$F_{am}(x) + F_0 + \sum_{n=1}^{N_{hs}} \left( F_h[n] \cos\left(\frac{2\pi}{\lambda x} h[n]x + \phi_h[n]\right) \right),$$

with parameters defined as, $$V_{g,j} = [F_0, h[1], h[2] \ldots, h[N_{hs}], F_h[1], F_h[2] \ldots, F_h[N_{hs}], \phi_h[1], \phi_h[2] \ldots, \phi_h[N_{hs}]]^T$$

Figure 17:
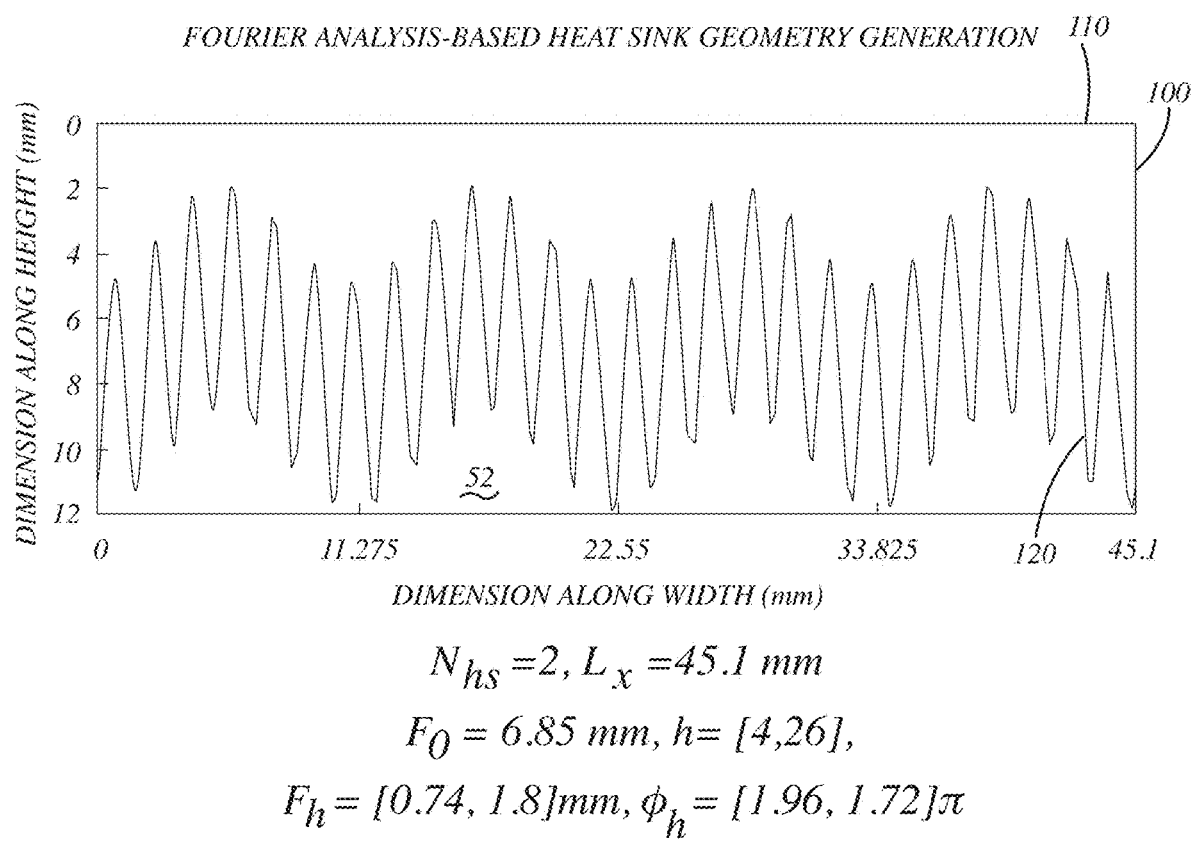
FIG. 17 shows a heat sink generated in accordance with one embodiment of the present disclosure based on a Fourier series.
Figure 18:
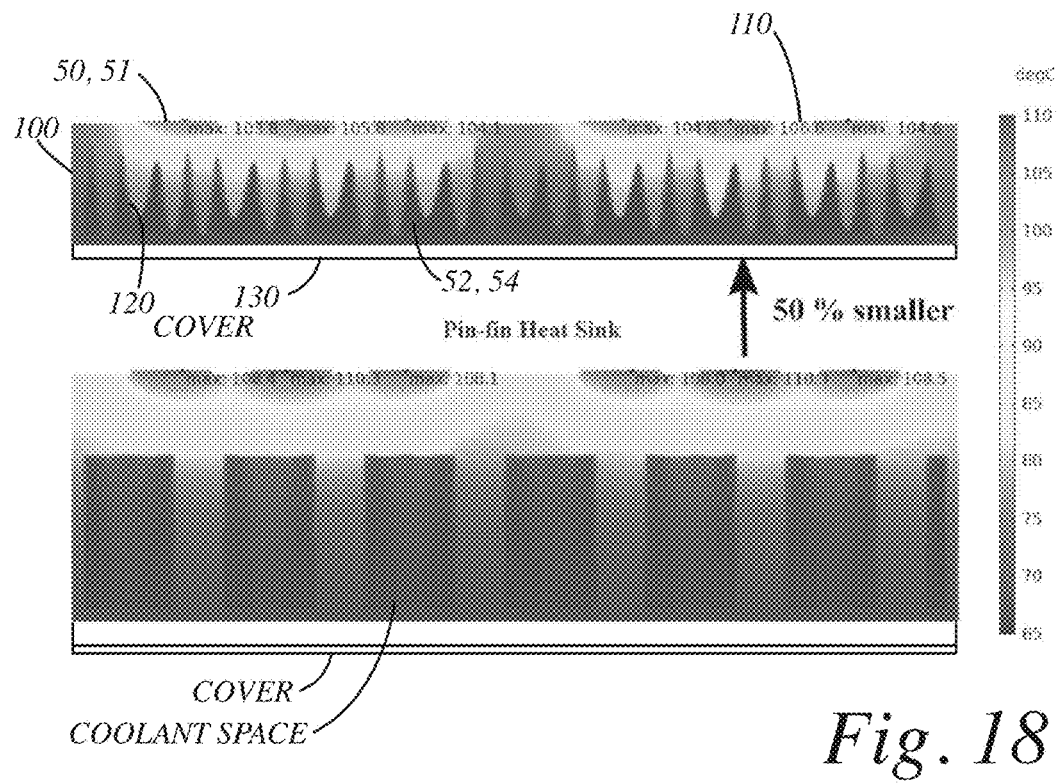
FIG. 18 shows a comparison of an embodiment relative to a conventional pin-fin heat sink.
Figure 19:
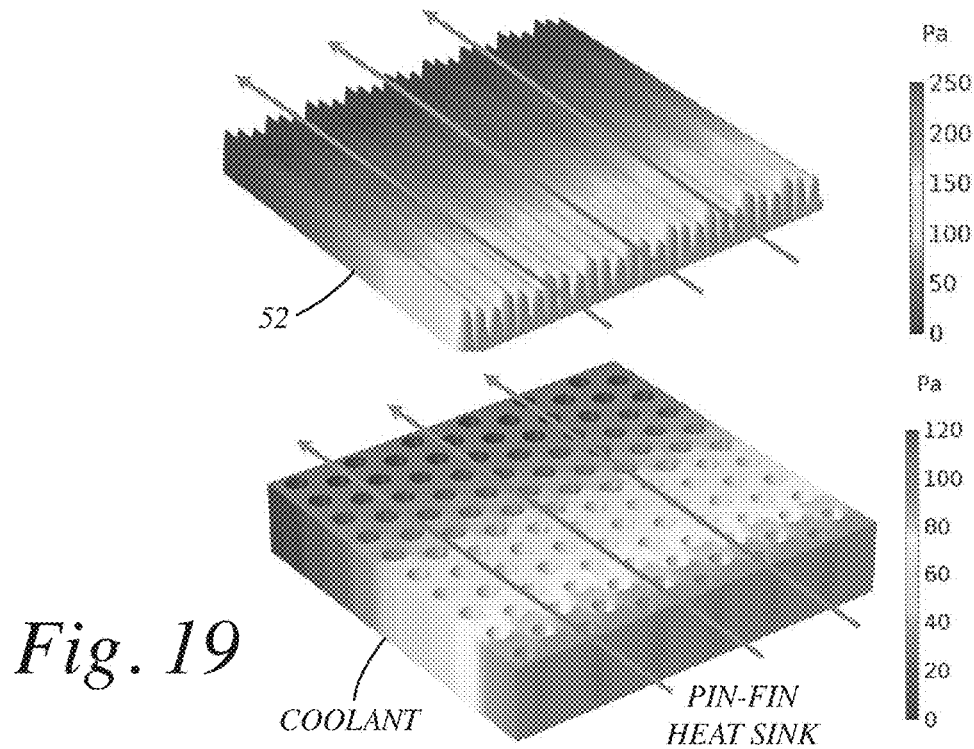
FIG. 19 shows a comparison of fluid flow for the heat sink depicted in FIG. 18.
Figure 20:
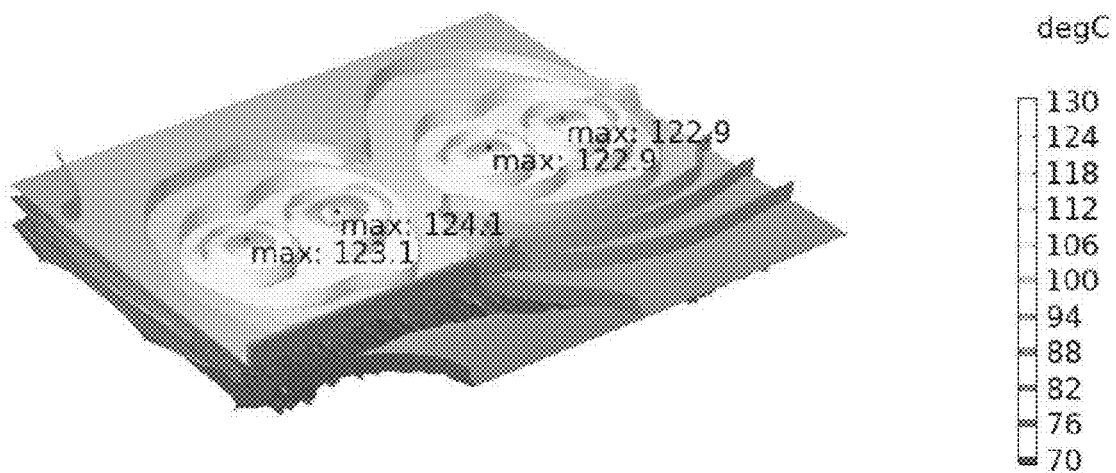
FIG. 20 shows a temperature distribution with respect to operation of a heat sink, generated in accordance with one embodiment of the present disclosure.
Figure 21:
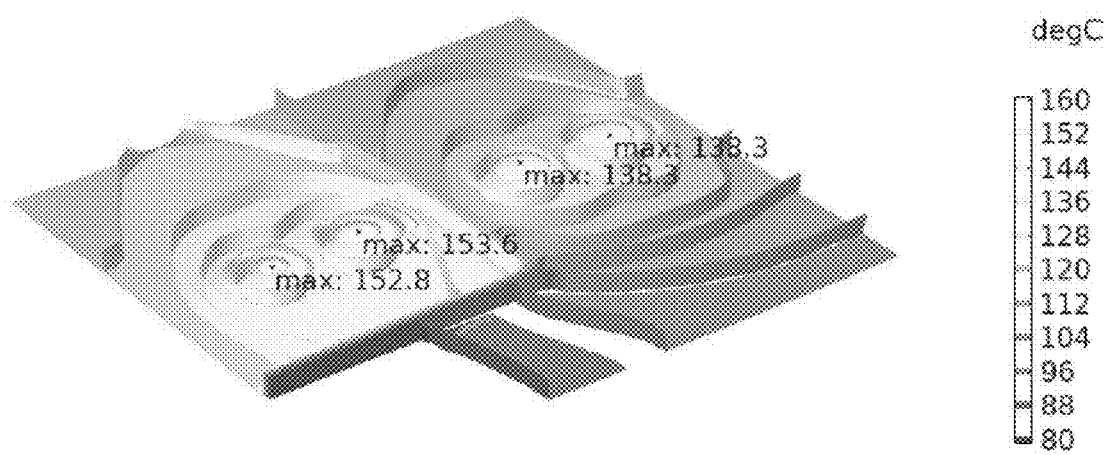
FIG. 21 shows a temperature distribution with respect to a conventional heat sink for comparison with the temperature distribution identified in FIG. 20.

In other words, consider a 2-D surface S confined in area spanned by $\{0<x<L_x, 0<y<L_y\}$ in a Cartesian co-ordinate system where $L_x$ & $L_y$ are maximum allowed horizontal and vertical dimensions, respectively. The 2-D object is additively manufactured starting from y=0. In one embodiment, the structure does not have holes in it, and can be defined using a single dimensional curve with each point of the curve representing the height of the material added to the structure. Using mathematical representation of a stationary wave, the surface of the additively manufactured structure $F_{a/m}(x)$ can be expressed using the summation of sinusoidal harmonics of the equation identified in the preceding paragraph, where F0 is a constant shift, λx is the wavelength (which is also equal to Lx), h[n] is the harmonic order and Fh[n] and φh[n] are its amplitude and phase shift, respectively, and Nhs is the total number of harmonics considered. Total number of variables equals to (3Nhs+1) including the shift F0 in the structure. An illustration of the harmonic geometry generation is shown in FIG. 17, where a complex heat sink structure is represented by two harmonics. The second surface 120 in the illustrated embodiment of FIG. 17 is defined in accordance with the Fourier function with $N_{hs}=2$, $L_x=45.1$ mm, $F_0=6.85$ mm, h=[4.26], $F_h=[0.74, 1.8]$ mm, $\phi_h=[1.96, 1.72]\pi$ is shown in the illustrated embodiment of FIG. 17. N or the number of harmonics or the number of terms may vary depending on the application, such as from 2 to less than ∞, or from 2 to 20, or from 2 to 1000.

The heat sink configuration (e.g., heat sink DNA) may be defined by Fourier parameters of this function. In this way, a few variables or a reduced number of variables can represent a complex heat sink geometry. In order to arrive at a heat sink construction in accordance with one embodiment, the heat sink generator may adjust one or more of the Fourier parameters, such as the constant shift $F_0$, the harmonic order, harmonic amplitudes, and harmonic faces, or a combination thereof.

To create a 3-D structure, the 2-D surface may be extended along the third dimension.

In one embodiment, heat sink evaluation according to a method 2000 of the present disclosure may be conducted by the heat sink generator 200 for selecting a heat sink 100 from a plurality of heat sinks generated geometrically. In one embodiment, generation and evaluation may first involve defining a set of variables. For instance, using the Fourier based geometric representation, the harmonic content in a heat sink structure may create a variable space with a size of (3Nhs+1). Few geometrical constraints may be imposed so that the structures comply with constraints. Such geometrical constraints may include limits on minimum and maximum allowed for heat sink height, and a limit on maximum allowed Reynolds number. The heat sink height constraints may limit minimum and maximum possible heat sink volume, and the Reynolds number constraint may limit the flow to be laminar.

Next, the cooling performance of a candidate heat sink may be measured using FEA studies. Heat sink candidates for the circuitry 50 may be evaluated with respect to worst-case steady-state thermal performance. The heat loading conditions used for the heat sink evaluation may be taken for circuitry 50 at its peak power/current load by operating in a steady-state condition.

The circuitry 50 and candidate heat sinks may be analyzed at heat output for peak load, and steady-state FEA simulation may be carried out to simulate the heat transfer and coolant flow in a candidate heat sink. To reduce the computational time for evaluation, the coolant properties may be considered temperature invariant. Furthermore, the coolant flow may be considered to be fully-developed laminar with a fixed input volume flow rate at heat sink input surface. The fluid flow and heat transfer under these conditions may be considered weakly coupled. As a result, evaluation in one embodiment may involve a computing coolant flow in the heat sink by assuming a fixed temperature, and then determining heat transfer by using the solved coolant flow.

After the FEA simulation, metrics of interest may be evaluated to determine the design fitness for an optimization engine. Potential metrics of interest are heat sink volume and coolant pressure drop, and minimization may be a target for both heat sink volume and pressure drop. The volume minimization may increase the power density of the circuitry 50, and the pressure drop minimization may reduce the pumping requirements for the fluid.

A Genetic Algorithm (GA) may be used as the optimization engine herein in accordance with one embodiment. Heat sinks 100 may be optimized for junction temperature and average pressure drop across the heat sink. Parameters of the parameterized function, such as the Fourier parameters, may be provided as part of a population set of candidate heat sinks. As described herein, by using a harmonic population of candidate heat sinks, a 2D cross-section of candidate heat sinks can be created. The genetic algorithm passes information to generate a structure of the candidate heat sink, which extends the 2D cross-section in length with a fixed shape for the creation of a 3D candidate heat sink structure. The candidate heat sink may then be combined with the circuitry 50 and pass to a finite element analysis for computation of steady-state heat transfer and coolant flow performance. After the finite element analysis, the heat sink may be verified against imposed constraints. If it is successful in passing the constraints, the genetic algorithm may optimize and use the simulation results to compute a heat sink performance metric using factors such as pressure drop, device temperature, and volume. The performance data may be used to determine design fitness, which the genetic algorithm may then be used to optimize heat sink design population. After optimization, a solution of a multi-objective optimization is a Pareto-optimal front of candidate designs.

The genetic algorithm may rely on a past and current population to determine one or more adjustment variables for a future population based on operators. For instance, the genetic algorithm may run for n operations with each generation operating on m solutions (population size). The Fourier parameters may correspond to design variables, which are stored in a vector to represent a single population element J as:

$$V_{g,j} = [F_0, h[1], h[2] \ldots, h[N_{hs}], F_h[1], F_h[2] \ldots, F_h[N_{hs}], \phi_h[1], \phi_h[2] \ldots, \phi_h[N_{hs}]]^T,$$

where j∈{1, 2, ... m}. This design vector $v_{g,j}$ can also be viewed as the genetic sequence (i.e., DNA) of the population element.

The GA population at its generation α, $P_g$, α, may be stored by using:

$$P_{g,\alpha} = [v_{g,1} v_{g,2} \ldots v_{g,m}]$$

where α∈{1, 2, ... n}, and $v_{g,j}$ is the jth population element. Matrix $P_{g,\alpha}$ may have a size [(3$N_{hs+1}$), m], where the number of rows (3$N_{hs+1}$) is equal to the number of design variables for each heat sink, and the number of columns m is equal to the population size or the number of candidate heat sinks in each population.

For a given solution search space, the GA algorithm may start by creating its initial/first population $P_{g,1}$, which may be generated randomly to capture different regions in the search space. This initial population may then be passed to a computational analysis stage to compute its performance. The computational analysis stage may first use a structure formation tool to generate the heat sink for each member of a population, and may then evaluate performance for each candidate heat sink using FEA. The results of the FEA analysis may be supplied to the genetic algorithm.

The genetic algorithm may use a selection operation to create a mating pool by using population elements with better fitness values. A roulette wheel selection method may be used. The mating pool may be created by using an existing population with selection probability proportional to their fitness value. High fitness population elements may have a higher chance of being selected in the pool. The process may be repeated until the mating pool is full. Using the mating pool, a crossover operation may be performed in which two population elements create two offspring using genetic crossover. The genetic sequence of one parent may be crossed with the genetic sequence of the other parent using a single or multipoint crossover to yield two new population elements. In a single point crossover for gene $v_{g,1}$ and $v_{g,2}$, a random location identifier between 1 and 3$N_{hs+1}$ may be selected, and the contents of the two gene sequences may be swapped to create two new offspring. Multipoint crossover may operate in a similar manner by selecting two or more random locations in a gene and crossing over the genetic information.

To mimic genetic evolution, a mutation operation may be performed. With probability $p_m$, a gene is mutated so that it's genetic sequence $v_{g,j}$ is modified at a single or multiple positions. At this stage, and elitism operator may also be used to preserve the best genes for a next population to guard these genes from being altered significantly. Additional or alternative genetic algorithm operators may be used, such as a diversity control and random search to control and preserve the population diversity. At the end of the genetic algorithm operations, a new population's algorithm should continue. Verification may be based on the generation counsel that the optimization process may be repeated until n generations. If the generational number is less than n, the heat sink evaluation and same set of genetic algorithm operators may be performed again to create another new population.

In the case of a multi-objective optimization algorithm, where the objectives of optimization is to oppose each other, multiple non-dominating solutions may be present and termed Pareto-optimal front of designs. In one embodiment, reducing the heat sink volume decreases the available coolant volume. For a given length of circuitry 50, the coolant volume reduction may also reduce the cooling cross-sectional area, leading to an increased coolant pressure drop across the heat sink. As a result, one target metric (or objective) according to the present disclosure is to minimize heat sink volume and pressure drop, which may counteract each other. The multi-objective optimization approach may determine solutions that are no better than each other. For example, in the illustrated embodiment of FIG. 13, objectives 1 and 2 are minimized, with the 2D plots shown for objectives 1 and 2. The illustrated embodiment demonstrates the available solution region, with diamond points in the region being associated feasible solutions. Because the goal is to minimize both objectives, the solutions in set S={'a', 'b', 'c', 'd'} identified by circles because these solutions are considered to outperform other designs.

However, of the four designs in the set S, none is considered better than the other. Design a outperforms all other designs in terms of objective 1, but it does not do well in terms of objective 2 when compared with designs b, c, and d. Similarly, design b performs better than designs c and d, but it does not perform better than design e in terms of objective 1. However, design B performs better than design a in terms of objective 2. Based on similar reasoning, none of the designs and set S outweighs another in all the objectives.

For instance, if the design e is considered relative to set S, with respect to design b, e is worst in both objectives 1 and 2. As a result, design b dominates design e. Set S is a non-dominated set of solutions in which no design is better than the other, and therefore design e can be included in set S. By using this non-dominated selection scheme, the Pareto-optimal front of designs or candidates for a multi-objective optimization problem can be identified. For instance, with respect to the example discussed herein in connection with FIG. 15, the designs that are boxed-in correspond to a Pareto-optimal front of designs or candidate heat sinks.

As described to herein, candidate heat sinks may be evaluated in accordance with one or more criteria including heat extraction performance. The evaluation may be conducted with respect to the circuitry 50 being modeled under steady-state conditions that generate heat. The evaluation may include constraints such as volume and pressure drop. For instance, a candidate heat sink may be selected as the heat sink 100 for use in practice based on a minimum volume and minimum pressure drop for the cooling medium 52.

In the illustrated embodiments of FIGS. 15-21, a heat sink 100 is generated by the heat sink generator 200 in accordance with one embodiment and compared against a conventional construction. The heat sink generator 200 in the illustrated embodiment may obtain fixed parameters, such as width (45.1 mm) and length (42.7 mm) of the heat sink, each heat source of the circuitry 50 generating steady-state 45 W of loss at 100/3 A, water being used as a cooling medium 52 and supplied at a rate of 10/6 liters per minute and at 65° C., a heat sink material type being aluminum, and the total number of harmonics in the structure being 10. The harmonic order may be limited between one and 100. The design space considered by the heat sink generator 200 may $10^{40}$ candidate, and the genetic algorithm may utilize 40 population elements, operating for 40 generations. In practice, total computation time on an eight core CPU for this configuration may be approximately five days.

Figure 15:
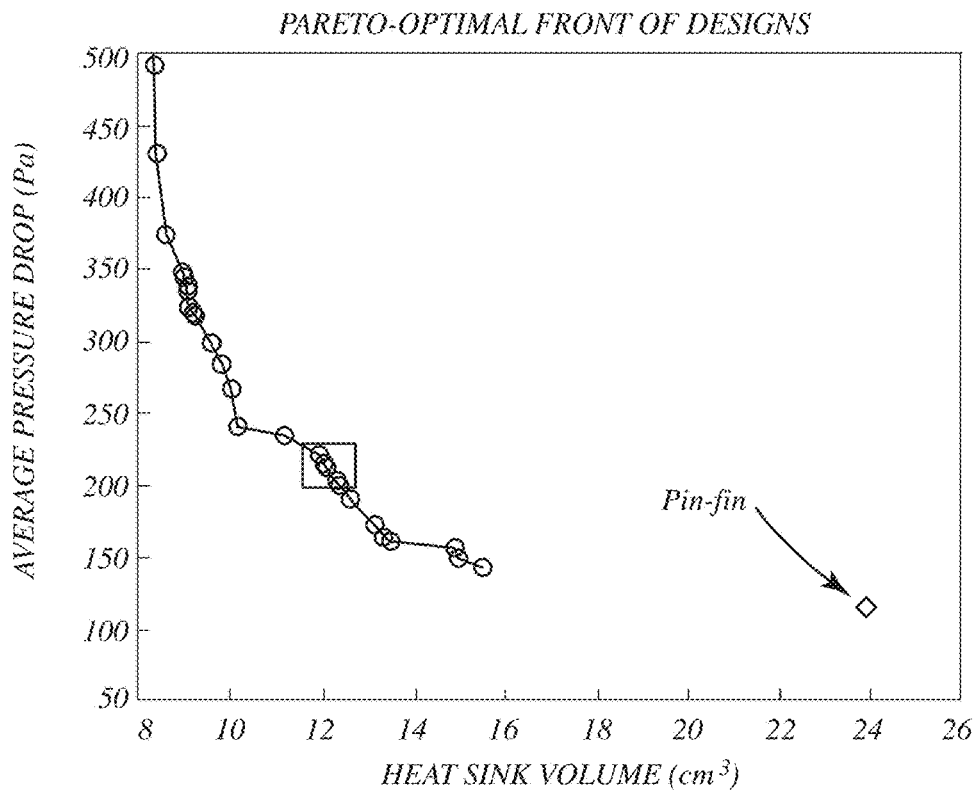
FIG. 15 shows a Pareto-optimal front analysis of candidate heat sinks in accordance with one embodiment.
Figure 16A:
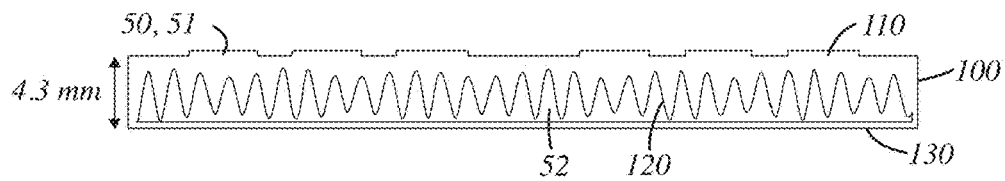
FIG. 16A shows a candidate heat sink identified in FIG. 15 in accordance with one embodiment.
Figure 16B:
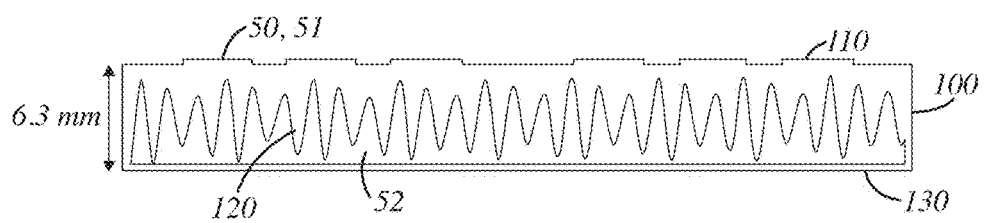
FIG. 16B shows a candidate heat sink identified in FIG. 15 in accordance with one embodiment.
Figure 16C:
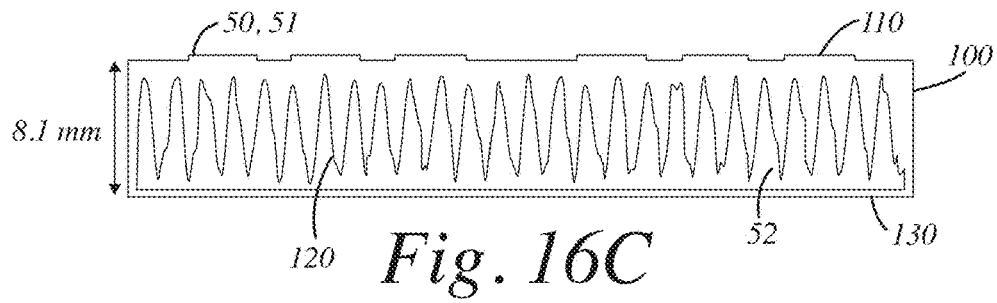
FIG. 16C shows a candidate heat sink identified in FIG. 15 in accordance with one embodiment.

Operative values for heat sink volume in average pressure drop relative to a heat sink construction that achieves an acceptable level of heat extraction from the circuit 50 are shown in the illustrated embodiment of FIG. 15, with several example embodiments of such heat sink constructions depicted in the illustrated embodiments of FIGS. 16A-C. A conventional pan-fin heat sink is identified in FIG. 15 for reference.

As can be seen, a heat sink 100 generated in accordance with one embodiment of the present disclosure may achieve 33 to 63% volume reduction relative to the conventional pin-fin heat sink construction. Relative to the pin-fin heat sink construction, the heat sink 100 has an additional pressure drop of approximately 110 Pa, adding about 20 W per meter squared or less than 5 mW extra pump power requirement. This additional power requirement for pressure drop is considered acceptable or within design parameters relative to gains achieved in volume reduction. Steady-state thermal performance and fluid flow comparisons for a conventional pin-fin heat sink construction and a heat sink 100 generated in accordance with one embodiment of the present disclosure are depicted in the illustrated embodiments of FIGS. 18 and 19. Likewise, temperature distribution for the heat sink 100 generated in accordance with one embodiment of the present disclosure is depicted for the circuitry 50 in FIG. 20, and temperature distribution for a conventional pin-fin heat sink construction is depicted for the same circuitry 50 in FIG. 21.

The heat sink generator 200, in generating a heat sink 100 based on an evolutionary algorithm and finite element analysis may enable development of heat sink configurations tailored for specific objectives. In one embodiment, an optimal heat sink configuration may be generated to yield significant performance improvements relative to a conventional configuration.

A heat sink 100 generated in accordance with one or more embodiments of the present disclosure may be manufactured in a variety of ways. The material type of the heat sink may vary depending on the application, and as described herein, properties of the material type may affect the analysis and generation of the heat sink 100. Example materials include aluminum and copper. Example manufacturing methods include the heat sink 100 being machined from metal stock (e.g., aluminum stock), die cast, or 3-D printed via multi-layered metal deposition.

In one embodiment, it is noted that the circuitry 50 may be generally optimized for minimum electrical parasitics (e.g., stray inductance) by considering the minimum spacing between dies for thermal decoupling. The layout of the circuitry 50 may assume sufficient heat spreading and transfer from dies to a cooling structure. For circuitry 50 that uses a direct substrate cooling method, the base plate may be removed, leading to a steady-state thermal asymmetry in the circuitry 50 due to insufficient heat spreading/transfer. This may cause significant temperature differences among the devices in the circuitry 50. Such unintentional thermal asymmetries can lead to undesirable asymmetries in operation, such as asymmetry in power conversion among semiconductor devices for circuitry 50 in the form of a power module. This asymmetry can impact reliability.

With advances in power conversion density, the heat sink generator 200 may be configured to also consider uniformity in operation of semiconductor devices of the circuitry. One aspect of uniformity is the observed thermal impedance by semiconductor chips in the circuitry 50. In the absence of sufficient heat spreading or transfer in advanced packaging schemes for circuitry 50, individual semiconductor devices may experience differences in the thermal impedance offered by the cooling system. For steady-state operation, such thermal impedance imbalances may lead to significant temperature differences among components (e.g., devices) of the circuitry 50.

One embodiment of the heat sink generator 200 described herein, operating in accordance with one or more methods of the present disclosure may mitigate thermal imbalance via evolutionary optimization. For instance, a heat sink 100 may be generated for a substrate of the circuitry 50 so that steady state temperature imbalance among components of the circuitry 50 is minimized or reduced. In the case of the circuitry 50 being a power module, the power conversion density may be maximized.

The thermal loading of each component of the circuitry 50, for FEA simulations, may be increased by a factor of $\alpha_{hl} > 1$ where the cooling system may be retained and component temperatures may be computed. The incremental thermal resistance for each component of the circuitry may be computed as:

$$R_{th,inc,\xi} = \frac{T_j, \max, a_{hl}, \xi - T_j, \max, 1, \xi}{(a_{hl} - 1)P_{cw}, \xi}$$

where $\xi \in \{M_1, M_2, \ldots\}$ are the components of the circuitry 50, $T_j$, max, $\alpha_{hl}$, $\xi$ is the maximum component temperature at $\alpha_{hl}$ factor load, and $P_{cw}$, $\xi$ is the continuous peak-rated loading condition for component $\xi$. The imbalance in the study-stay thermal resistance $R_{th,im}$ may be defined as:

$$R_{th,im} = \max_{\xi}(R_{th,inc,\xi}) - \min_{\xi} R_{(th,inc,\xi)}$$

In order to reduce the study-stay thermal imbalance, a metric for evaluation in conjunction with the genetic algorithm may include $R_{th,im}$, with a target for minimization of this metric. In other words, an optimization algorithm in accordance with one embodiment may identify a Fourier series variable set that minimizes the difference in thermal impedance relative to one or more other Fourier series variable sets.

With a mathematical definition of thermal imbalance, the heat sink generator 200 in accordance with one embodiment may for a given layout of circuitry 50 for a given maximum current rating are maximum heat loading.

The heat sink geometries may be represented as a combination of armada geometries and a DC constant $F_0$. For a given current load (or heat loaded), module layout, cooling parameters, coolant flow rate, and heat sink material parameters, the heat sink construction may be modeled according to the following:

$$F_{hs}(x) = H_0 + \sum_{n=1}^{N_{hs}} \left( A_h[n] \cos\left(\frac{2\pi}{\lambda_x} h[n]x + \phi_h[n]\right) \right), x \in [0, W_x]$$

And, the design variable vector (or geometrical design vector) $\theta_g$ may be given as: $\theta_g = $
$\overline{\text{DC Shift}}$ $[H_0 \; \underbrace{h[1]h[2] \; \ldots \; h[N_{hs}]}_{\text{Harmonic Orders}} \underbrace{A_h[1]A_h[2] \; \ldots \; A_h[N_{hs}]}_{\text{Harmonic Amplitudes}} \underbrace{\phi_h[1] \; \phi_h[2] \; \ldots \; \phi_h[N_{hs}]}_{\text{Harmonic Phase Angles}}]$ The length of the $\theta_g$ vector is $(3N_{hs}+1)$, and the limits on each element in $\theta_g$ may be determined from the limits on the maximum allowed height and volume constraints.

Along with the variable vector, a few fix parameters may be stored in vector D as:

$$D=[M_{fp} C_{fp} S_{cp}]$$

where $M_{fp}$ may contain all of the fix parameters of the circuitry layout and its current loading; $C_{fp}$ may contain all the fix parameters of the cooling system such as: parameters, flow rate, and material parameters; and $S_{cp}$ may contain all constrained parameters for the design, such as limits on the maximum junction temperature and maximum coolant temperature rise.

One or more additional constraints may be imposed on the heat sink construction to assist the heat sink generator 200 in discarding solutions or spaces that either do not yield physically viable designs or fail to fulfill a design criteria. The first constraints imposed may include a uniqueness of the harmonic selection. That is, the vector h in $\theta_g$ may be constrained to contain unique elements:

$$h[n_1] \neq h[n_2], \forall (n_1, n_2) \in (1, 2, \ldots N_{hs}), n_1 \neq n_2.$$

In other words, and inequality constrained may be imposed such that:

$$\text{unique}(h) \geq N_{hs}$$

where unique (.) Computes the number of unique elements in the vector. It is noted that this equation includes unique elements in h that may always be less than or equal to $N_{hs}$ because the number of elements in h equal $N_{hs}$. A greater than equal to inequality may be imposed, keeping population-based algorithms in mind in case of convergence with the quality constraints.

A constrained and the height of the heat sink $H_{hs}$ may be imposed such that:

$$H_{hs} = (\max(F_{hs}) - \min(F_{hs})) \leq H_{ht,max},$$

where $H_{ht,max}$ is the maximum allowed heat sink height. For a given layout of the circuit 50, this constraint may also limit the maximum value of the allowed volume.

Additional or alternative constraints may be imposed on the solution of the heat sink FEA simulation. For instance, constraints such as the fluid flow being fully developed laminar to reduce computational time may be imposed. The Reynolds number of the fluid flow solution $R_{N,hs}$ may be maintained below a maximum threshold:

$$R_{N,hs} \leq Re_{max}$$

To limit the semiconductor temperature, a constraint may be imposed on the maximum component (e.g., die) temperature:

$$\max_{\xi} (T_{sic,\xi}) \leq T_{sic,max},$$

where $T_{sic,\xi}$ is the temperature of die $\xi$, and $T_{sic,max}$ is the maximum allowed SiC chip temperature for an application.

The change in coolant inlet and outlet surface average temperature may be constrained by:

$$\overline{T_{c,out}} - \overline{T_{c,in}} \leq \delta_{T,c,max},$$

where $\overline{T_{c,in}}$ and $\overline{T_{c,out}}$ are the surface average coolant temperatures that the inlet and outlet, respectively and $\delta_{Tc,max}$ is the maximum allowed change in coolant temperature.

In one embodiment, the heat sink generator 200 may be configured to maximize power density of the circuitry 50 as well as minimize imbalance and thermal resistance. The maximum allowed current rating of devices of the circuitry may be known before optimization, therefore maximizing power density may be an exercise in minimizing power module volume $V_{pm}$. Power module volume with a heat sink may be computed as:

$$V_{pm} = W_{pm} \cdot L_{pm} \cdot (H_{pm} + H_{hs}),$$

where $H_{pm}$ is the thickness of the layout of the circuitry 50 including components, such as SiC devices, and substrate, and $W_{pm}$ and $L_{pm}$ are the width and length of the circuitry 50, respectively. The thermal resistance metric $R_{th,im}$ may be computed after numerical simulation of the circuitry 50 with a candidate heat sink.

The selection function for the genetic algorithm may be expressed as:

$$f = \begin{cases} \varepsilon [1\ 1]^T \left( \dfrac{C_s - N_C}{N_C} \right) & C_s < C_1 \\ \left[ \dfrac{1}{R_{th,im}} \dfrac{1}{V_{pm}} \right]^T C_{sw} & = C_1 \end{cases}$$

where $$C_s = \sum_{i=1}^{N_c} c_i,$$

and where $N_c$, $C_s$, and $C_I$ are the total number of constraints, the number of team constraints satisfied, and the number of strains imposed during the evaluation of the objective function respectively. $c_i$ may be the ith constraint, and $\varepsilon$ may be a small positive number on the order of $10^{-6}$.

Computation of $c_i$ may be conducted such that if it is less than equal to a constraint of the form $x \leq x_{mx}$, $$c_i(x, x_{mx}) = \begin{cases} 1 & x \leq x_{mx} \\ \dfrac{1}{1 + x - x_{mx}} & x > x_{mx} \end{cases};$$

otherwise, for a greater than equal to constraint of the form $x \geq x_{mn}$, $$c_i(x, x_{mn}) = \begin{cases} 1 & x \geq x_{mn} \\ \dfrac{1}{1 + x_{mn} - x} & x < x_{mn} \end{cases};$$

If constraint i is satisfied, $c_i=1$; otherwise, $c_i<1$. If all the constraints are not satisfied, the objective function may yield a small negative number. Otherwise, the inverse of the design metrics may be calculated. These forms of constraint and fixedness functions may be advantageous for generating a heat sink in accordance with one embodiment of the present disclosure, with a heat distribution that is less imbalanced as depicted in illustrated embodiment of FIG. 20 relative to the last balanced he distribution of a conventional heat sink depicted in illustrated embodiment of FIG. 21.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A heat sink for extracting heat from circuitry during operation of the circuitry, the heat sink comprising:
   a solid, thermally conductive material having
      a first surface configured to
         support components of the circuitry disposed on the first surface in selectively arranged positions, and
         be thermally coupled with the circuitry such that heat generated by the components of the circuitry is transferred through the first surface into the solid, thermally conductive material and such that the heat is distributed within the solid, thermally conductive material based on at least one of the selectively arranged positions of the components on the first surface;
      a second surface opposing the first surface, the second surface arranged to contact a cooling medium; and
      a cover arranged and configured to encapsulate the cooling medium between the cover and the second surface and form, in conjunction with the second surface, channels that cause the cooling medium to flow in a flow direction;
   wherein a cross-section of the second surface that is orthogonal to the flow direction is shaped in accordance with a predetermined linear combination of sinusoidal spatial harmonics including a total number of terms N that satisfies the conditions $2 \leq N \neq \infty$; and
   wherein the linear combination of sinusoidal spatial harmonics was predetermined based on the distribution of the heat transferred between the first surface of the solid, thermally conductive material and the second surface thereof.

2. The heat sink of claim 1 wherein the cooling medium is a cooling fluid.

3. The heat sink of claim 1 wherein the cross-section of the second surface is substantially uniform along the flow direction of the cooling medium.

4. A power module comprising:
   a substrate;
   the circuitry disposed on the substrate; and
   the heat sink of claim 1, wherein the heat sink is disposed on the substrate and is thermally coupled with the circuitry.

5. The power module of claim 4 comprising:
   a manifold fluidly connected to the channels of the heat sink and a source of cooling fluid; and
   the manifold configured to supply the cooling fluid, at a first temperature, from the source of the cooling fluid to the heat sink, and return the cooling fluid, at a second temperature larger than the first temperature, from the heat sink back to the source of the cooling fluid.

6. The power module of claim 5 wherein the cooling fluid includes one or more of water and glycol.

7. The power module of claim 4, wherein the power module is configured as a power-converter device, wherein the circuitry comprises Si or SiC-based power-electronic switches.

* * * * *